United States Patent
Brolin et al.

(10) Patent No.: US 7,382,722 B2
(45) Date of Patent: Jun. 3, 2008

(54) ARCHITECTURE FOR A HYBRID STM/ATM ADD-DROP MULTIPLEXER

(75) Inventors: Stephen J. Brolin, Livingston, NJ (US); Robert W. DeMarco, Whippany, NJ (US)

(73) Assignee: Fujitsu Limited, Kanagawa-ken (JP)

( * ) Notice: Subject to any disclaimer, the term of this patent is extended or adjusted under 35 U.S.C. 154(b) by 265 days.

(21) Appl. No.: 11/302,619

(22) Filed: Dec. 14, 2005

(65) Prior Publication Data

US 2006/0092829 A1  May 4, 2006

Related U.S. Application Data

(62) Division of application No. 10/100,208, filed on Mar. 18, 2002, now Pat. No. 7,012,917, which is a division of application No. 09/325,187, filed on Jun. 3, 1999, now Pat. No. 6,359,859.

(51) Int. Cl.
H04L 12/26 (2006.01)
H04L 12/44 (2006.01)
H04L 12/66 (2006.01)
H04J 14/08 (2006.01)

(52) U.S. Cl. ............... 370/219; 370/401; 370/407; 370/425; 398/2; 398/58

(58) Field of Classification Search ............ 370/219, 370/401, 407, 425; 398/2, 58
See application file for complete search history.

(56) References Cited

U.S. PATENT DOCUMENTS

| | | | | |
|---|---|---|---|---|
| 5,321,691 A * | 6/1994 | Pashan | ............... | 370/395.7 |
| 5,353,282 A | 10/1994 | Dormer et al. | ............ | 370/58.1 |
| 5,359,600 A | 10/1994 | Ueda et al. | ............... | 370/399 |
| 5,384,766 A | 1/1995 | Yamato et al. | ............... | 370/13 |
| 5,408,469 A | 4/1995 | Opher et al. | ............... | 370/60.1 |
| 5,412,652 A | 5/1995 | Lu et al. | ............... | 370/85.12 |
| 5,526,349 A | 6/1996 | Diaz et al. | ............... | 370/58.1 |
| 5,557,778 A | 9/1996 | Vaillancourt | ............... | 395/500 |

(Continued)

FOREIGN PATENT DOCUMENTS

EP    0 674 457 A3    5/1998

(Continued)

OTHER PUBLICATIONS

Thomas C. Banwell et al. "Physical Design Issues for Very Large ATM Switching Systems" Communications, vol. 9, No. 8, Oct. 1991, pp. 1227-1238.

(Continued)

*Primary Examiner*—Alpus H Hsu
(74) *Attorney, Agent, or Firm*—Weingarten, Schurgin, Gagnebin & Lebovici LLP

(57) ABSTRACT

A network element including an active/standby pair of line units, an active/standby pair of switch fabric units, at least one service unit, and a management and control unit. Each line unit maintains data communications using a first communications protocol. Each switch fabric unit maintains data communications using a second communications protocol. Each service unit includes a first backplane interface supporting the first communications protocol, and a second backplane interface supporting the second communications protocol. The management and control unit provides a control infrastructure for selectively communicating data units between the active/standby pair of line units, the active/standby pair of switch fabric units, and the service unit, responsive to provisioning information or information contained within the respective data unit.

9 Claims, 17 Drawing Sheets

U.S. PATENT DOCUMENTS

| | | | |
|---|---|---|---|
| 5,664,107 A | 9/1997 | Chatwani et al. | 395/200.54 |
| 5,675,735 A | 10/1997 | Gallagher et al. | 709/228 |
| 5,734,656 A | 3/1998 | Prince et al. | 370/401 |
| 5,737,334 A | 4/1998 | Prince et al. | 370/395 |
| 5,809,024 A | 9/1998 | Ferguson et al. | 370/395.53 |
| 5,809,253 A | 9/1998 | Gallagher et al. | 709/228 |
| 5,818,842 A | 10/1998 | Burwell et al. | 370/397 |
| 5,852,606 A | 12/1998 | Prince et al. | 370/395.53 |
| 5,894,477 A | 4/1999 | Brueckheimer et al. | 370/353 |
| 5,923,851 A | 7/1999 | Gallagher et al. | 709/228 |
| 5,933,607 A | 8/1999 | Tate et al. | 370/395.61 |
| 5,999,528 A | 12/1999 | Chow et al. | 370/365 |
| 6,023,465 A | 2/2000 | Brueckheimer et al. | 370/386 |
| 6,134,238 A | 10/2000 | Noh | 370/395 |
| 6,151,305 A | 11/2000 | Chen | 370/238 |
| 6,243,382 B1 * | 6/2001 | O'Neill et al. | 370/395.52 |
| 6,252,846 B1 * | 6/2001 | Fujita | 370/220 |
| 6,256,292 B1 | 7/2001 | Ellis et al. | 370/227 |
| 6,275,499 B1 | 8/2001 | Wynn et al. | 370/438 |
| 6,356,544 B1 * | 3/2002 | O'Connor | 370/353 |
| 6,480,494 B1 | 11/2002 | Hawley | 370/395.61 |
| 6,496,519 B1 * | 12/2002 | Russell et al. | 370/465 |
| 6,580,709 B1 | 6/2003 | Gorshe et al. | 370/352 |
| 6,658,006 B1 * | 12/2003 | Chen et al. | 370/395.1 |
| 6,667,973 B1 | 12/2003 | Gorshe et al. | 370/376 |
| 6,757,268 B1 | 6/2004 | Zendle | 370/338 |
| 6,891,836 B1 * | 5/2005 | Chen et al. | 370/395.51 |
| 6,917,586 B1 * | 7/2005 | Mauger et al. | 370/230 |

OTHER PUBLICATIONS

Hirokazu Ohnishi et al., "All Band Switching Node Architecture for Flexible and Cost-Effective Evolution Toward B-ISDEN" Symposium, vol. 1, Apr. 1995, pp. 57-61.

Erwin P. Rathgeb et al., "The MainstreetXpress Core Services Node—A Versatile ATM Switch Architecture for the Full Service Network" Communications, vol. 15, No. 5, Jun. 1997, pp. 795-806.

Ryan Hankin Ken, Inc. "Loop Access Systems: Technology and Markets", Dec. 1998, 2 pages.

* cited by examiner

000
ARCHITECTURE FOR A HYBRID STM/ATM ADD-DROP MULTIPLEXER

CROSS REFERENCE TO RELATED APPLICATIONS

This application is a divisional of U.S. patent application Ser. No. 10/100,208, filed Mar. 18, 2002 now U.S. Pat. No. 7,012,917, entitled SERVICE UNIT FOR A HUB HAVING MULTIPLE STAR INTERCONNECT CONFIGURATIONS, which is a divisional of U.S. patent application Ser. No. 09/325,187, filed Jun. 3, 1999 now U.S. Pat. No. 6,359,859, entitled ARCHITECTURE FOR A HYBRID STM/ATM ADD-DROP MULTIPLEXER, issued as U.S. Pat. No. 6,359,859.

STATEMENT REGARDING FEDERALLY SPONSORED RESEARCH OR DEVELOPMENT

N/A

BACKGROUND OF THE INVENTION

The invention relates generally to communication systems, and more specifically to an architecture for a hybrid STM/ATM add-drop multiplexer.

As it is generally known, SONET (Synchronous Optical Network) defines a set of standards for a synchronous optical hierarchy that has the flexibility to transport many digital signals having different capacities. A corresponding international synchronous digital hierarchy (SDH) standard provides a set of definitions analogous to those of SONET. The synchronous nature of SONET is provided by a receive side and a transmit side clock in each network element (NE). In order to synchronize the receive and transmit clocks, a SONET network element, such as an add-drop multiplexer, includes circuitry to recover clock signals from various sources that may be available, and to distribute highly accurate clocks internally based on such recovery.

A central timing source provides a Building Integrated Time Source, also referred to as a "BITS" clock, that may be provided out-of-band to each network element in a SONET ring. If a network element is for some reason not able to receive the BITS clock directly, an embedded clock may be recovered by that device from an incoming line that should reflect the centrally provided BITS clock.

The basic building block in SONET is a synchronous transport signal level-1 (STS-1), which is transported as a 51.840-Mb/s serial transmission using an optical carrier level-1 (OC-1) optical signal. Higher data rates are transported using SONET by multiplexing N lower level signals together. To this end, SONET defines optical and electrical signals designated as OC-N (Optical Carrier level-N) and STS-N (Synchronous transport signal level-N), where OC-N and STS-N have the same data rate for a given value of N. Accordingly, just as STS-1 and OC-1 share a common data rate of 51.84 Mb/s, OC-3/STS-3 both have a data rate of 155.52 Mb/s.

Information transported via an STS-1 signal is organized as frames, each having 6480 bits (810 bytes). An STS-1 frame includes transport overhead and a Synchronous Payload Envelope (SPE). The SPE includes a payload, which is typically mapped into the SPE by what is referred to as path terminating equipment at what is known as the path layer of the SONET architecture. Line terminating equipment, such as an OC-N to OC-M multiplexer, is used to place an SPE into a frame, along with certain line overhead (LOH) bytes. The LOH bytes provide information for line protection and maintenance purposes. The section layer in SONET transports the STS-N frame over a physical medium, such as optical fiber, and is associated with a number of section overhead (SOH) bytes. The SOH bytes are used for framing, section monitoring, and section level equipment communication. Finally, a physical layer in SONET transports the bits serially as either electrical or optical entities.

The SPE portion of an STS-1 frame is contained within an area of an STS-1 frame that is typically viewed as a matrix of bytes having 87 columns and 9 rows. Two columns of the matrix (30 and 59) contain fixed stuff bytes. Another column contains STS-1 POH. The payload of an SPE may have its first byte anywhere inside the SPE matrix, and, in fact may move around in this area between frames. The method by which the starting payload location is determined is responsive to the contents of transport overhead bytes in the frame referred to as H1 and H2. H1 and H2 store an offset value referred to as a "pointer", indicating a location in the STS-1 frame in which the first payload byte is located.

The pointer value enables a SONET network element to operate in the face of certain conditions which may, for example, cause the STS-1 frame rate to become faster or slower than the SPE insertion rate. This situation may arise when the clock of the NE must be derived from a relatively less accurate clock source, in order to continue operation, when a more accurate source, such as the BITS clock itself, has been lost. In such a case, an extra byte may need to be transmitted in what is known as a negative justification opportunity byte, or, one less byte may be transmitted in a given STS-1 frame so as to accommodate the SPE, thus causing the location of the beginning of the payload to vary.

Various digital signals, such as those defined in the well-known Digital Multiplex Hierarchy (DMH), may be included in the SPE payload. The DMH defines signals including DS-0 (referred to as a 64-kb/s time slot), DS-1 (1.544 Mb/s), and DS-3 (44.736 Mb/s). The SONET standard is sufficiently flexible to allow new data rates to be supported, as services require them. In a common implementation, DS-1s are mapped into virtual tributaries (VTs), which are in turn multiplexed into an STS-1 SPE, and are then multiplexed into an optical carrier-N (OC-N) optical line rate.

The payload of a particular SPE may be associated with one of four different sizes of virtual tributaries (VTs). The VTs are VT1.5 having a data rate of 1.728 Mb/s, VT2 at 2.304 Mb/s, VT3 at 3.456 Mb/s, and VT6 at 6.912 Mb/s. A superframe consists of four STS-1 frames, and is used to transmit a VT. The alignment of a VT within the bytes of the payload allocated for that VT is indicated by a pointer contained within two VT pointer bytes, which contain a pointer offset similar to the STS-1 pointer described above.

Existing add-drop multiplexers (ADMs) are SONET multiplexers that allow DS-1 and other DMH signals to be added into or dropped from an STS-1 signal. Traditional ADMs have two bi-directional ports, and may be used in self-healing ring (SHR) network architectures. An SHR uses a collection of network elements including ADMs in a physical closed loop so that each network element is connected with a duplex connection through its ports to two adjacent nodes. Any loss of connection due to a single failure of a network element or a connection between network elements may be automatically restored in this topology. Existing ADMs have additionally included a cross-connect matrix for directing STM signals from one interface to another. Such a cross-connect matrix is referred to as an STM switch fabric. The manner in which specific STM signals are directed between interfaces of the STM switch fabric depends on how the network bandwidth has been "provisioned" to the various customers using the network. The path of a signal through a given cross-connect matrix is statically defined based on provisioning information provided from a central office or "craft" technician.

As mentioned above, SONET provides substantial overhead information. SONET overhead information is accessed, generated, and processed by the equipment which terminates the particular overhead layer. More specifically, section terminating equipment operates on nine bytes of section overhead, which are used for communications between adjacent network elements. Section overhead supports functions such as: performance monitoring (STS-N signal), local orderwire, data communication channels (DCC) to carry information for OAM&P, and framing. The section overhead is found in the first three rows of columns 1 through 9 of the SPE.

Line terminating equipment operates on line overhead, which is used for the STS-N signal between STS-N multiplexers. Line overhead consists of 18 overhead bytes, and supports functions such as: locating the SPE in the frame, multiplexing or concatenating signals, performance monitoring, automatic protection switching, and line maintenance. The line overhead is found in rows 4 to 9 of columns 1 through 9 of the SPE.

Path overhead bytes (POH) are associated with the path layer, and are included in the SPE. Path-level overhead, in the form of either VT path overhead or STS path overhead, is carried from end-to-end; it is added to DS1 signals when they are mapped into virtual tributaries and for STS-1 payloads that travel end-to-end. VT path overhead (VT POH) terminating equipment operates on four evenly distributed VT path overhead bytes starting at the first byte of the VT payload, as indicated by the VT payload pointer. VT POH provides communication between the point of creation of an VT SPE and its point of disassembly.

STS path terminating equipment terminates STS path overhead (STS POH) consisting of nine evenly distributed bytes starting at the first byte of the STS SPE. STS POH provides for communication between the point of creation of an STS SPE and its point of disassembly. STS path overhead supports functions such as: performance monitoring of the STS SPE, signal labels (the content of the STS SPE, including status of mapped payloads), path status, and path trace. The path overhead is found in rows 1 to 9 of the first column of the SPE.

Asynchronous Transfer Mode (ATM) is a cell-based transport and switching technology. ATM provides high-capacity transmission of voice, data, and video within telecommunications and computing environments. ATM supports a variety of traffic types, including constant bit-rate (CBR) traffic—like full-motion video and voice—where delays and cell loss cannot be tolerated. ATM also supports variable bit-rate (VBR) applications—like LAN traffic and large file transfers—where delay can be tolerated.

ATM establishes virtual connections which may be shared by multiple users. Each ATM virtual connection is identified by a combination of a Virtual Channel Identifier and a Virtual Path Identifier, referred to as a VCI/VPI value. ATM is a transport technology that formats all information content carried by the network into 53-byte cells. Since these cells are short in length and standard in size, they can be switched through network elements known as ATM switches with little delay, using what is referred to as an ATM switch fabric. Since various types of traffic can be carried on the same network, bandwidth utilization can be very high. These characteristics make the network very flexible and cost effective.

An ATM switch fabric operates to direct ATM cells from one interface to another. For a given received cell, the specific output interface of the ATM switch fabric is determined in response to a VCI/VPI value contained within the cell. Virtual channel and virtual path routing information is dynamically modified in the switch fabric as connections are established and torn down in the network. In this way the ATM switch fabric operates in response to dynamically changeable virtual connection information.

ATM cells may be encapsulated and transmitted over SONET for example using STS-1 or STS-3c, which is a concatenation of three STS-1 signals. STS-1 transports may generally be concatenated, and the combination then referred to as STS-Nc, where N is the number of STS-1 signals that are combined. In the case of STS-3c, the SPE of the resultant STS-3c frame consists of 3×783 bytes, together with POH. The concatenated STS-1s are multiplexed, switched, and transported as a single unit. An overhead byte of the STS-3c frame transport overhead, referred to as the H4 byte, contains an offset indicating the number of bytes between the H4 byte and the first ATM cell that is contained in the SPE.

In many cases customers require support for both ATM switching and STM switching in their communications systems. However, devices provided by vendors to support SONET have typically lacked the capability to also support ATM. In particular, typical existing ADMs have supported only SONET rings, while existing ATM switches have generally supported only ATM. Accordingly, if a customer has needed both SONET and ATM networks, they have necessarily had to purchase dedicated SONET equipment (ADMs), in addition to ATM switches. This is costly in terms of necessitating multiple devices. In addition, most customers cannot predict what their future communications requirements will be when they buy one piece of equipment. Because existing systems have been restricted to supporting only one of either SONET or ATM switching, they have not been flexible or scalable with regard to adding support for the other protocol. As a result of such inflexibility, changes in customer requirements may require the purchase of completely new devices to support a previously unsupported protocol.

Accordingly, there is a need for a communication device which combines the functions of a SONET add-drop multiplexer with the functions of an ATM switch. The device should be capable of multiple configurations to support STM only, ATM only, or hybrid STM/ATM operation. Moreover, the device should be scalable such that additional functionality may be conveniently added as the needs of the customer change over time.

BRIEF SUMMARY OF THE INVENTION

An architecture for a hybrid STM/ATM add-drop multiplexer is disclosed. The disclosed architecture includes an interconnection system for a network element, having at least one line unit slot, a switch fabric slot, and two or more service unit slots. The line unit slot is connected as a hub to the switch fabric slot and the service unit slots in a first star interconnection configuration. The switch fabric slot is connected as a hub to the line unit slot and the service unit slots in a second star interconnection configuration. In a preferred embodiment, the switch fabric slot and one of the service unit slots comprise the same slot, thus permitting flexible configuration of the device. To support a configuration providing non-STM switching, the switch fabric slot is operable to receive a switch fabric unit that includes a non-STM switch fabric.

In an illustrative embodiment, a control unit slot is provided in the interconnection system, and connected as a hub to the line unit slot, the switch fabric slot, and the service unit slots to form a third star interconnection configuration. Each star interconnection configuration for example consists of dedicated point to point connections between the hub and each other slot in the configuration. The point to point connections employ a low voltage, complementary signaling mechanism, such as Low Voltage Differential Signaling (LVDS), in order to achieve high speeds, while controlling electromagnetic interference (EMI). Redundant line unit and switch fabric slots are provided, as well as respective redundant star configurations, to permit line units and switch fabric units to be configured in "active/standby" pairs, thus supporting greater system availability and robustness.

A line unit is also disclosed which may be disposed within the line unit slot. The disclosed line unit includes an STM switch fabric, as well as an optical interface to a SONET ring. The line unit module further includes two or more service unit interfaces for coupling the STM switch fabric to point to point interfaces within the first star interconnection configuration, so as to permit communication of information contained within the SONET frames between the line unit and service units disposed in the service unit slots. The disclosed line unit further includes at least one ATM interface, for communicating ATM cells between the line unit and an ATM switch fabric unit disposed in the switch fabric slot. The disclosed line unit provides what are referred to herein as the "service affecting" functions of the device with regard to STM. STM service affecting functions are those functions necessary to maintain continued operation of STM communication through the device. Accordingly, to provide fault recovery and avoid STM service interruptions, the device may be advantageously configured with an active/standby pair of line units.

An ATM switch fabric unit is disclosed which may be installed within the switch fabric slot. The disclosed ATM switch fabric unit includes two or more service unit interfaces which are coupled to point to point connections within the second star interconnection configuration. During operation of the device, ATM cells are communicated in ATM cell stream format between service units in the service unit slots and the switch fabric unit over the second star interconnection configuration. The disclosed ATM switch fabric unit provides what are referred to herein as the "service affecting" functions of the device with regard to ATM. ATM service affecting functions are those functions necessary to maintain continued operation of ATM communication through the device. Accordingly, to provide fault recovery and avoid ATM service interruptions, the device may be advantageously configured with an active/standby pair of ATM switch fabric units.

A management and control unit (MCU) is disclosed which may be installed in the control unit slot. The disclosed MCU communicates SONET overhead information over the third star interconnection configuration. The MCU further operates to download executable software images to service units installed in the network element over the third star interconnection configuration. The MCU provides what are referred to herein as the "non-service affecting" functions of the device.

A service unit for a network element is also disclosed, which includes a first backplane interface for connecting with the first star interconnection configuration within the network element. The first backplane interface to the first star interconnection configuration permits transport of STM frames to an STM switch fabric. The service units include a second backplane interface for connecting to the second star interconnection configuration. The second backplane interface to the second star interconnection configuration permits transport of ATM cells to the ATM switch fabric. In a preferred embodiment, the service unit further includes a third backplane interface to connect with the third star interconnect configuration for communication with the MCU within the network element.

Thus there is provided a communication device which combines the functions of a SONET add-drop multiplexer with the functions of an ATM switch. The disclosed device supports multiple configurations, including STM only, ATM only, or hybrid STM/ATM operation. Moreover, the disclosed device is flexible and scalable such that functionality may be added or modified as the needs of the customer change over time. The disclosed system advantageously applies low voltage, complementary signaling techniques such as Low Voltage Differential Signaling (LVDS) to provide high speed, serial point to point links in star configurations. The use of serial point to point links supports failure isolation, since failure of a single non-hub unit will not affect the connections of other units to the hub of the star. Accordingly, replacement of a non-hub unit is possible without disturbing the operation of the other units in the star. The disclosed system supports failure protection in hub units, such as the line units and ATM switch fabric units, by providing connectivity for active/standby unit pairs of the line unit and ATM switch fabric unit. In addition, by use of multi-function service unit slots, which can also serve as ATM switch fabric unit slots, the disclosed system supports a wide variety of configurations in a minimum amount of space.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
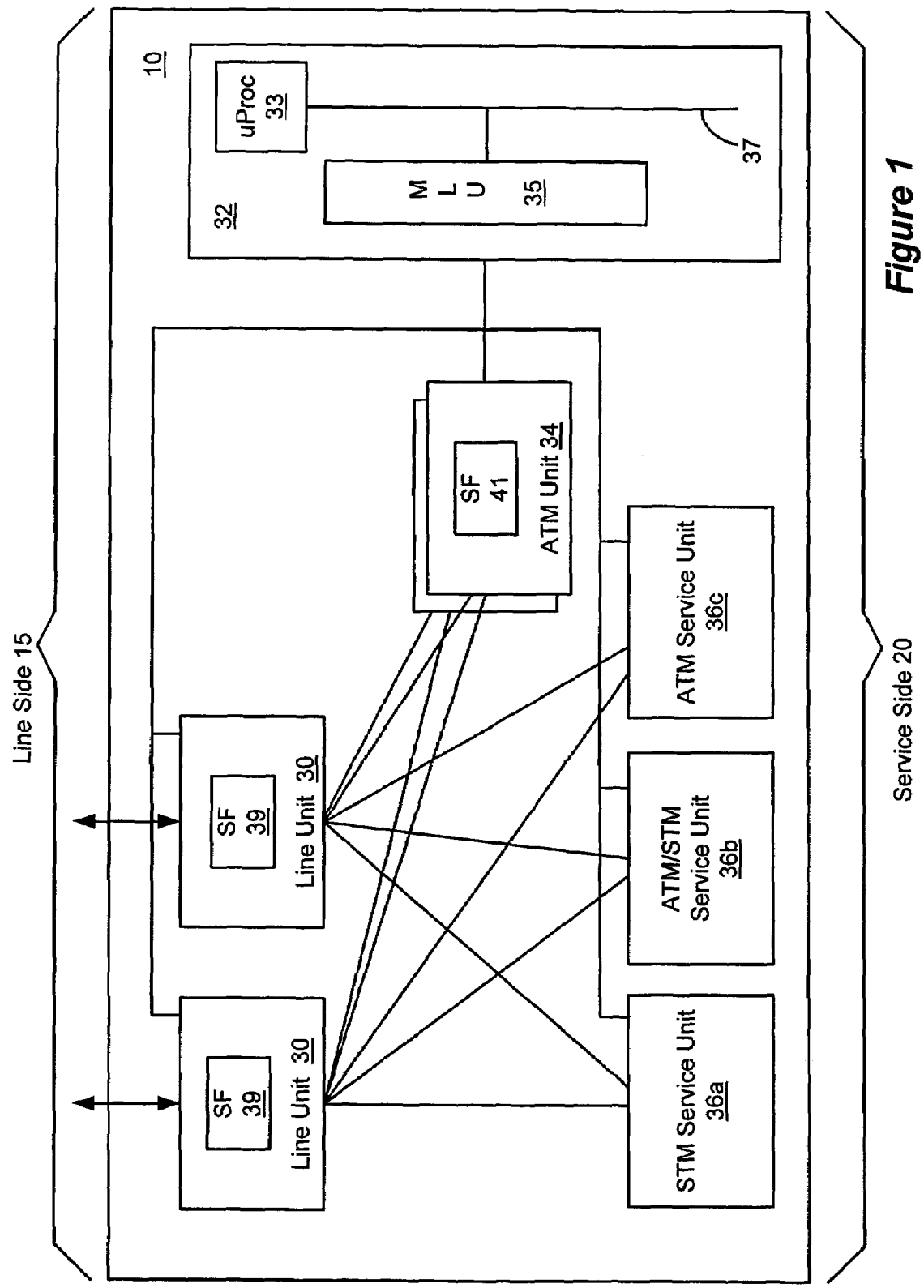
FIG. 1 shows module partitioning in an illustrative embodiment of the disclosed network element.

A network element (NE) architecture is disclosed which conveniently and efficiently combines the functions of a SONET add-drop multiplexer (ADM) with the functions of an ATM switch. As shown in FIG. 1, the disclosed network element 10 may be physically embodied as a set of hardware "units" interconnected across an interconnection system, also referred to as a backplane. The units, for example, include line units (LU) 30, a management and control unit (MCU) 32, ATM switch fabric units (ATMU) 34, and service units (SU) 36. The ATMU 34 provides ATM cell-relay related functionality, such as: VP and VC switching, segmentation and reassembly, signaling, routing, call control, traffic management, and Operations Administration, Management, and Provisioning (OAMP). In this regard, the ATMU may specifically provide address translation, an application programming interface (API) for user to network interface (UNI) signaling, an interim local management interface (ILMI) server, full ILMI and user network interface/network to network interface (UNI/NNI) signaling stacks, a private node-to-node interface (PNNI) server for routing, and connection admission. In an alternative embodiment, such ATM functionality may be split across two separate unit types: ATM Switch units (ATMSU) containing primarily the ATM switch fabric, and ATM Processing units (ATMPRU) providing other ATM functions.

In another alternative embodiment, an internet protocol (IP) switch fabric unit may be substituted for one of the ATM switch fabric units. The IP switch fabric unit performs switching (also known as "routing") at the IP layer of the TCP/IP protocol stack, using what is referred to herein as an IP switch fabric. The IP switch fabric unit may also provide an ATM switch fabric, together with such ATM functionality as described above.

The network element 10 provides (1) a SONET line interface on a line side 15, (2) connection of ATM traffic from either the line side 15 or a service side 20 to an ATM switch fabric unit 34, (3) connection of STM traffic from either the line side 15 or the service side 20 to STS/VT switch fabrics within the line units 30, (4) various service interfaces on the service side 30 through the specific service units 36. The ATM switch fabric unit 34 performs activities associated with ATM cell-relay. These for example include VP and VC switching, signaling, routing, call control, and traffic management.

The line units 30 may support various SONET optical media line interfaces, such as OC-3, OC-12, or any other suitable optical interface. The line unit provides interfaces to the ATM switch fabric unit 34 from a SONET ring on the line side 15, as well as to the various service units 36. The line unit also includes an STM switch fabric 39 capable of performing STM switching at both the STS and VT levels. Examples of ATM switch fabric unit 34 include modules providing connectivity to the line units 30, as well as to the service units 36, and which also include an ATM switch fabric 41.

Service units 36 include modules supporting various telecommunication or data communication interfaces to the service side 20, including for example DS-1, DS-3, Token Ring, FDDI (fiber distributed data interface), 10BaseT, 100BaseT, 10BaseF, or 100BaseF Ethernet, EC-1 (electrical carrier 1, also referred to as STS-1 electrical, or STS-1/EC-1), OC-3, OC-12 or any other suitable service. The service units 36 may communicate with the ATM switch fabric 41 installed in the ATM switch fabric unit 34 of the network element, as well as with the STM switch fabrics 39 contained within the line units 30. Accordingly, service units 36 for the network element 10 contain interfaces within the network element which may be considered to fall within three categories: STM, ATM, and STM/ATM. For example, STM service unit 36a formats data received from the service side 20 into STS frames to be forwarded to the line units 30, while ATM service unit 36c formats data received from the service side 20 into ATM cell streams to be forwarded to the ATM switch fabric unit 34. Since each service unit 36 is connected to both ATM and STM services, a single STM/ATM service unit 36b may simultaneously use ATM and STM switching services by selectively communicating the data it receives to the line units 30 and/or the ATM switch fabric unit 34.

Management and control unit 32 includes a subsystem employing a microprocessor 33 coupled to microprocessor bus 37. The illustrative MCU 32 provides a basic control infrastructure for the network element 10, using what is referred to herein as a "serialized hardbus". During operation of the network element 10, the components of the serialized hardbus convert a parallel bus communication protocol into a master/slave, serialized communication between the MCU 32 and the other units in the network element 10. A serialized hardbus master logic unit 35 is coupled to microprocessor bus 37 of the MCU and maps control and status registers and/or memory locations of other units in the network element onto the microprocessor memory map. Units within the device 10 which are managed by the MCU 32 include serialized hardbus termination logic. The serialized hardbus also provides notification of certain autonomous events and/or alarms, occurring on or detected by other units, by interrupting the microprocessor 33.

In addition to the serialized hardbus, the MCU 32 uses a SONET overhead link from each line unit 30 and service unit 36, to support maintenance communications such as Data Communications Channel (DCC) and OrderWire information. The MCU 32 further includes various management and control capabilities, such as DCC and Orderwire processing functionality, which may include a combination of hardware and software, and which are used to process the received maintenance information.

Figure 2:
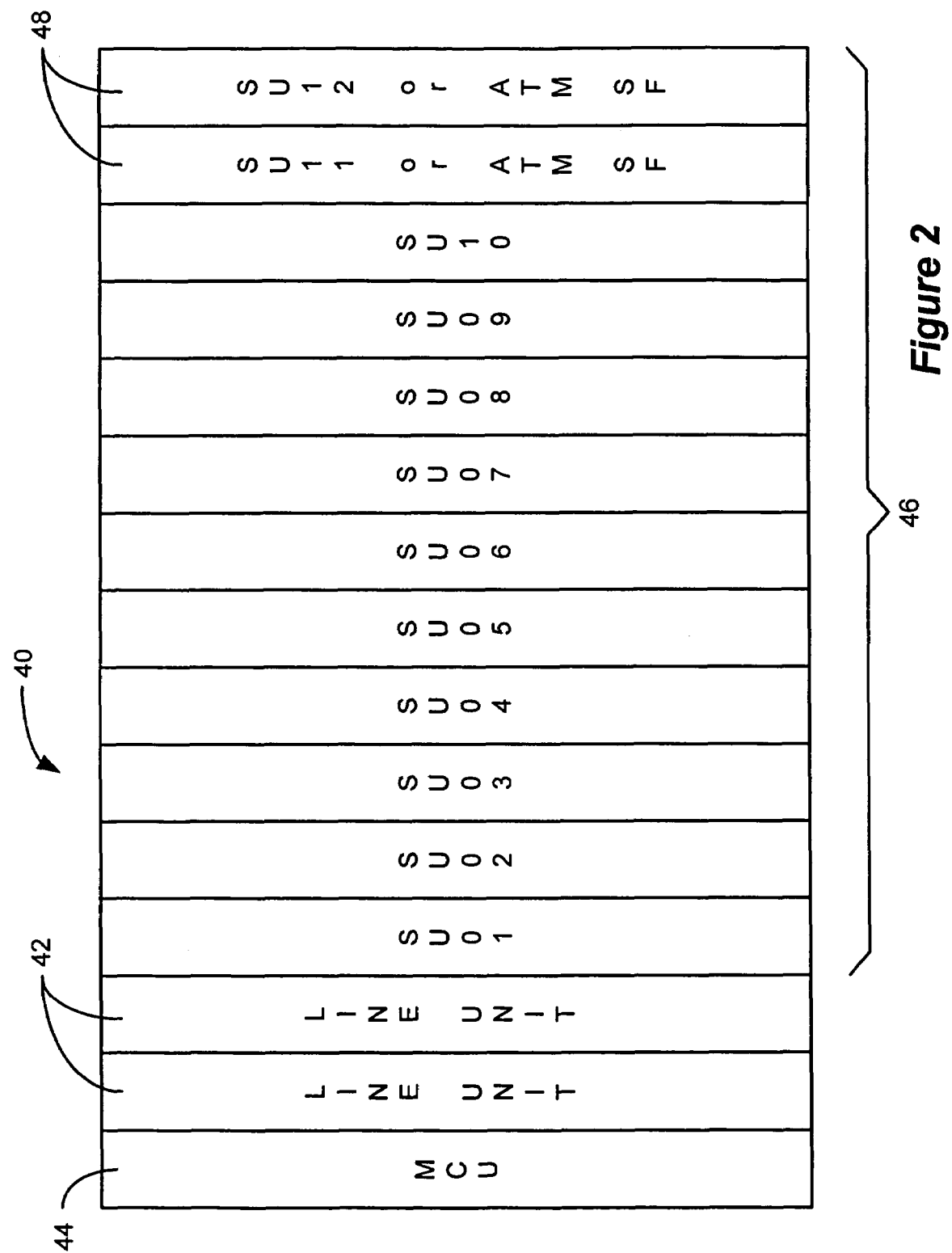
FIG. 2 shows the layout of slots in an illustrative embodiment of the disclosed network element interconnection system.

FIG. 2 shows an illustrative slot layout 40 for the disclosed interconnection system. The slot layout 40 of FIG. 2 includes several different types of slots, specifically line unit slots 42, management and control unit slot 44, and service unit slots 46. The service unit slots 46 include two slots 48 which may also be used as ATM switch fabric slots. The slots 48 are accordingly also referred to as switch fabric slots, or ATM switch fabric slots. The slots shown in FIG. 2 are each operable to receive hardware units as described in FIG. 1 of the corresponding type. For example, line unit slots 42 are operable to receive line units 30, service unit slots 46 are operable to receive service units 36, ATM switch fabric unit slots 48 are operable to receive ATM switch fabric units 34 or service units 36, and MCU slot 44 is operable to receive the MCU 32.

Figure 3:
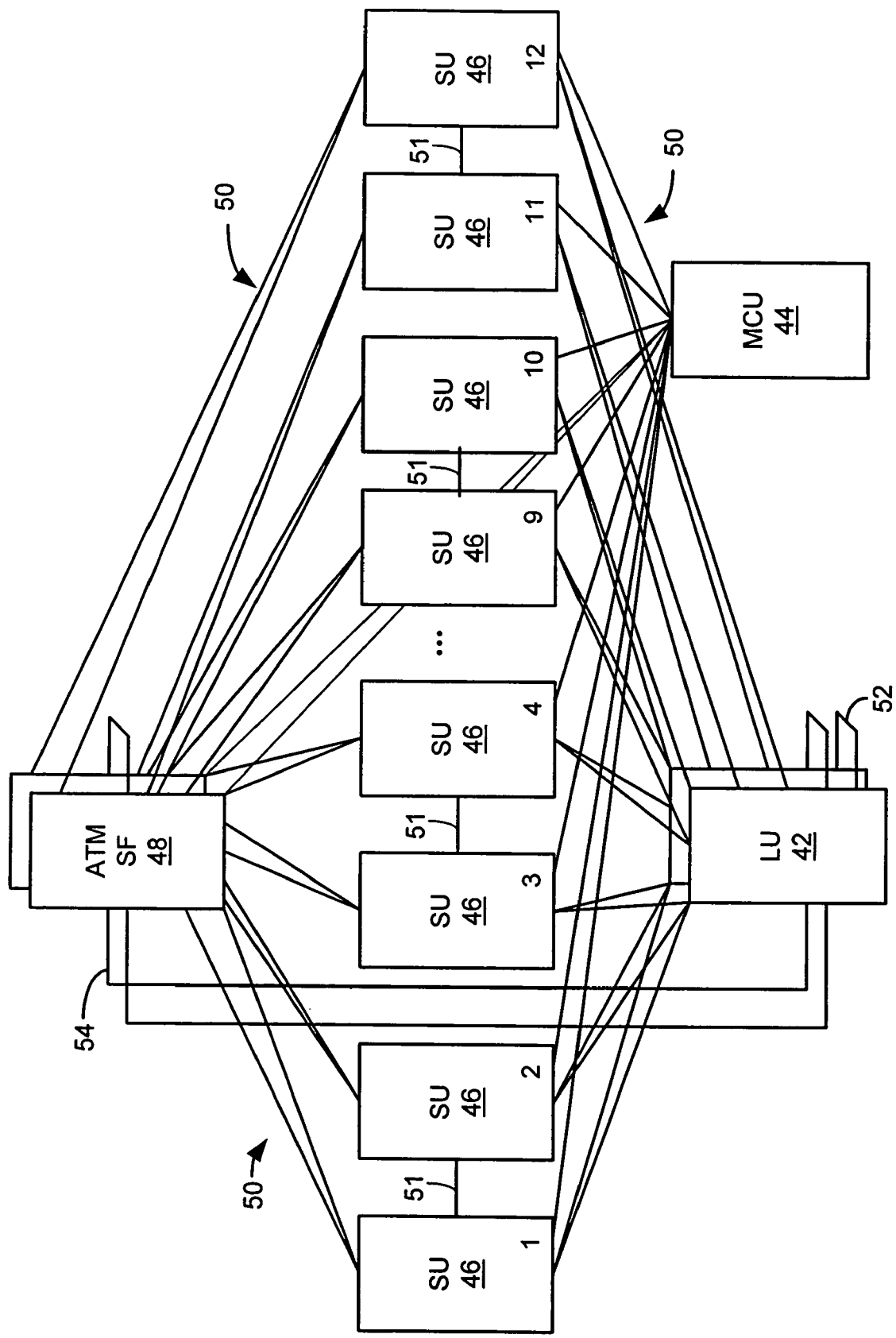
FIG. 3 illustrates multiple star interconnection configurations employed in the disclosed network element.

FIG. 3 illustrates the multi-star architecture of the disclosed interconnection system. As shown in FIG. 3, a number of point-to-point connections 50 form star configurations having the management & control unit slot 44, line unit slots 42, and ATM switch unit slots 48 as hubs. In a preferred embodiment, the point-to-point connections 50 are implemented using a low voltage, complementary signaling technique to achieve high speeds, such as Low Voltage Differential Signaling (LVDS). In addition, the point-to-point connections 50 are terminated in the backplane, without the presence of a service unit within any of the respective service unit slots 46. Accordingly, no additional physical termination is required for empty one of the service unit slots 46.

In the depiction of FIG. 3, and as shown in FIG. 2, two of the service unit slots 46 are the same as ATM switch fabric slots 48. Accordingly, when ATM switch fabric slots 48 are used to connect ATM switch fabric units, these same slots may not simultaneously be used to install service units. However, as shown in FIGS. 2 and 3, those two "multifunction" slots may alternatively be used to connect service units to the device in configurations where the ATM switch fabric units are not needed.

More specifically, in a preferred embodiment, each line unit slot 42 has two star configurations emanating from it. An STM datapath star communicates STM type data with each of the service unit slots 46. The second star emanating from each line unit slot 42 is a synchronization star for conveying a frequency reference and a frame alignment pulse (FP) to the service unit slots 46, in order to synchronize STM communication between each service unit and the STM switch fabrics within the line units. An extended synchronization module (ESM) may be provided to accept and distribute an extracted clock from the service unit slots 46 or, alternatively, a BITS clock from further interconnections within the device. The ESM is for example implemented on a sub-board module which is electrically and mechanically coupled to an alternative, enhanced version of the illustrative line unit.

In addition to the STM datapath and synchronization interconnection stars, a private datapath 52 is provided for communicating STM data between active and standby line units installed in respective ones of the line unit slots 42. The private datapath 52 facilitates a pass through path between the line units which may be required under certain conditions.

Further, in the illustrative embodiment of FIG. 3, the line unit slots 42 each have a datapath connection 54 to each of the ATM switch fabric slots 48. This interface supports ATM cell stream traffic between the ATM switch fabric slots 48 and the line unit slots 42. During operation of the device, ATM traffic from both line unit slots 42 (active and standby) is forwarded to each of the ATM switch fabric slots 48. Accordingly, per unit fault protection of the units in the line unit slots 42 and ATM switch fabric slots 48 may be provided independently, on a unit by unit basis.

Further, in the illustrative embodiment of FIG. 3, the MCU slot 44 has two star interconnect configurations emanating from it. First, an MCU control star is provided to support the serialized hardbus between the MCU and each other unit in the device. Second, a SONET overhead star supports communication of SONET overhead information, such as DCC and Orderwire data, as well as other information in the section, line, or path overhead portions of a SONET signal, between the MCU and other units in the device. The SONET overhead star connects the MCU slot 44 to each other slot in the device, via respective ones of the point to point connections 50, thus enabling communication of SONET overhead between the MCU and any other unit in the device, including service units installed in the service unit slots 46. The MCU slot 44 is further provided with a software image download interconnection with the ATM switch fabric slots 48 to facilitate communication of software executable image data between an ATM switch fabric unit installed in the ATM switch fabric slots 48 and the MCU, for example using the High-Level Data Link Control (HDLC) protocol. Such software executable image data may further be communicated from the MCU to individual ones of the services units installed in the service unit slots, over the serialized hardbus.

The ATM switch fabric slots 48 each have a datapath star emanating from them to all other service unit slots 46. Because these ATM datapath stars are routed to the other service unit slots 46 independently from any other star configuration, the cost of adding ATM features is independent of the costs associated with other functionality provided by the device.

The disclosed interconnection system supports ATM VP Path Switching within an active ATM switch fabric unit coupled to one of the ATM switch fabric slots 48, through the datapath connection 54. The datapath connection 54 between each of the ATM switch fabric slots 48 and both line unit slots 42 enables maintenance of a current switch state in both of the ATM switch fabrics within ATM switch fabric units in the switch fabric slots 48. Unlike support provided in the device for the SONET Unidirectional Path Switched Ring (UPSR), in which the pass through path is independently carried between the line units over the private datapath 52, the VP pass through path is internal to an active ATM switch fabric unit. Accordingly, each ATM switch fabric slot 48 supports full ATM bandwidth to and from each line unit slot 42 simultaneously.

Additionally, the ATM switch fabric slots 48 connect with an ATM Control Bus which extends to two of the service unit slots 46 which are adjacent to the ATM switch fabric slots 48, such as the service unit slots labeled SU09 and SU010 in FIG. 2. This bus enables division of the ATM switch fabric unit functionality into separate ATM Switching Unit and ATM Processing Unit modules. Such a division permits the number of modules and power allocation for the ATM function to be doubled by occupying 4 slots with ATM switch fabric units instead of 2.

For protected services, service unit slots 46 are allocated in pairs, to support operation of redundant service units. However, each one of the service unit slots 46 has independent connections to both the ATM switch fabric units (in the ATM switch fabric slots 48), and to both the STM switch fabrics in the line units (in the line unit slots 42). This allows for a configuration of up to 12 different unprotected service units to be supported simultaneously in an STM configuration, and 10 different unprotected service units in an STM/STM configuration. Configurable backplane private connections 51 between selected pairs of service unit slots 46 are also provided, to support active/standby service unit pairs, as well as active standby pairs of ATM switch fabric units in ATM switch fabric slots 48.

Figure 4:
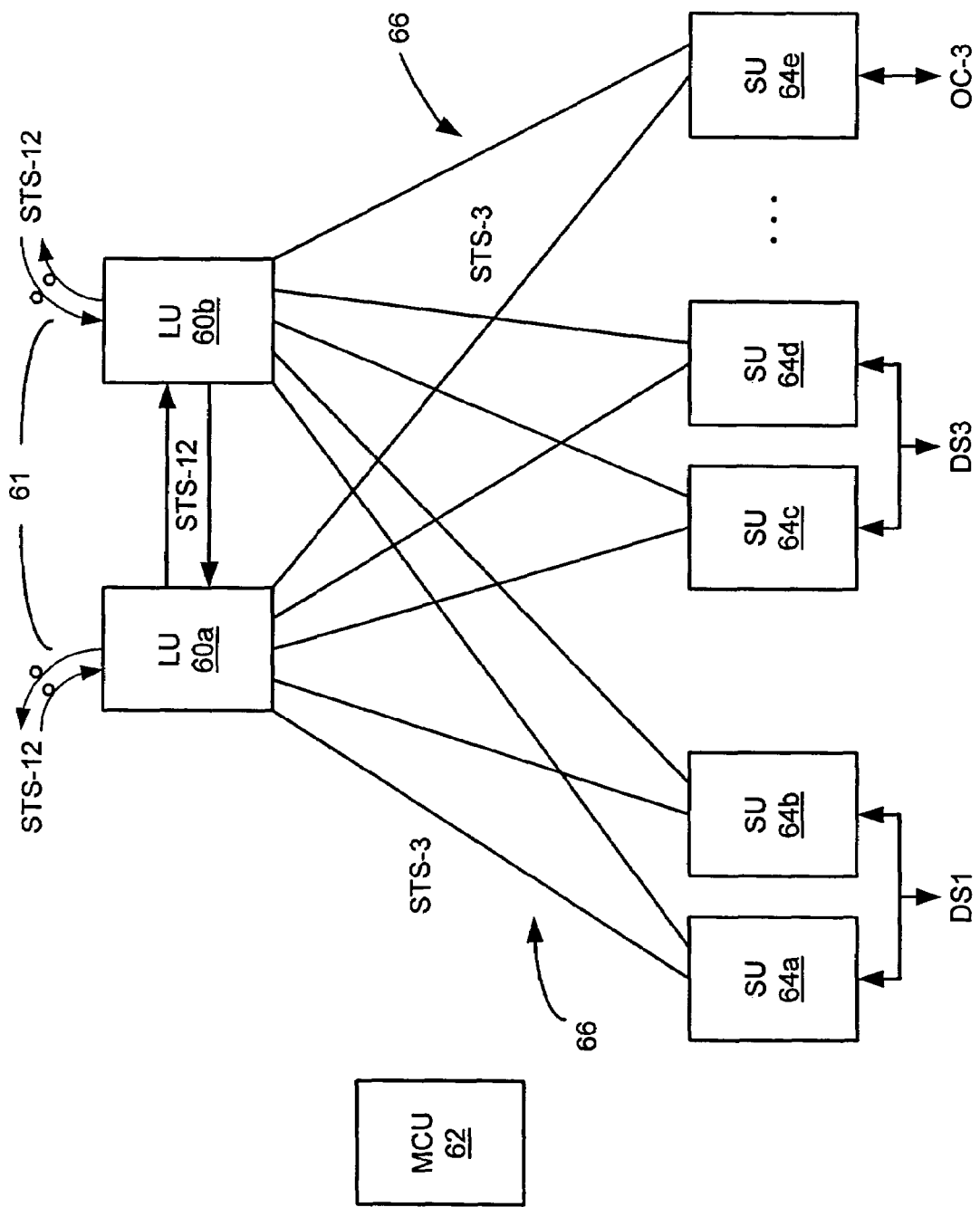
FIG. 4 shows an illustrative configuration of the disclosed network element providing synchronous transfer mode (STM) support.
Figure 5:
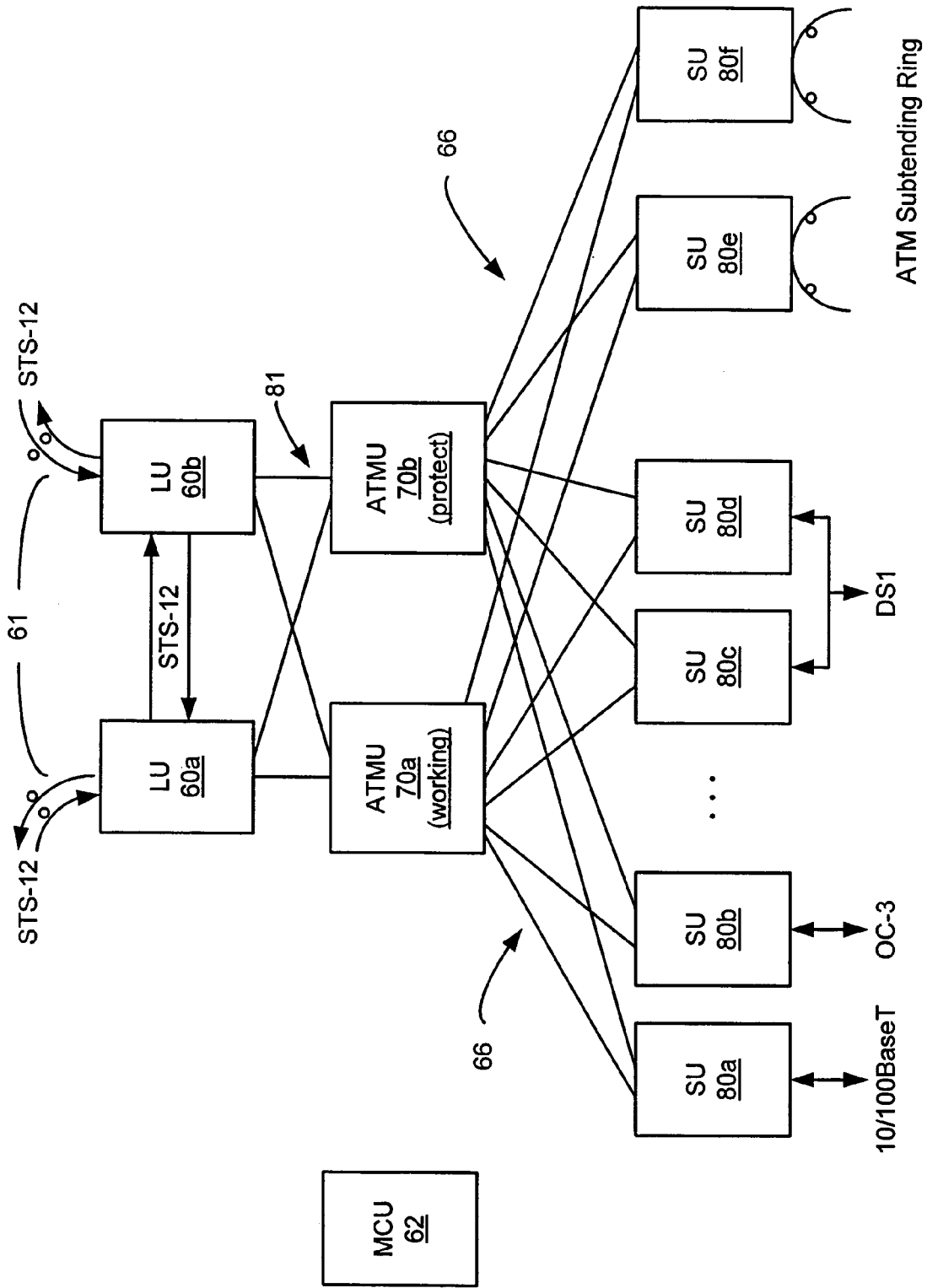
FIG. 5 shows an illustrative configuration of the disclosed network element providing asynchronous transfer mode (ATM) support.
Figure 6:
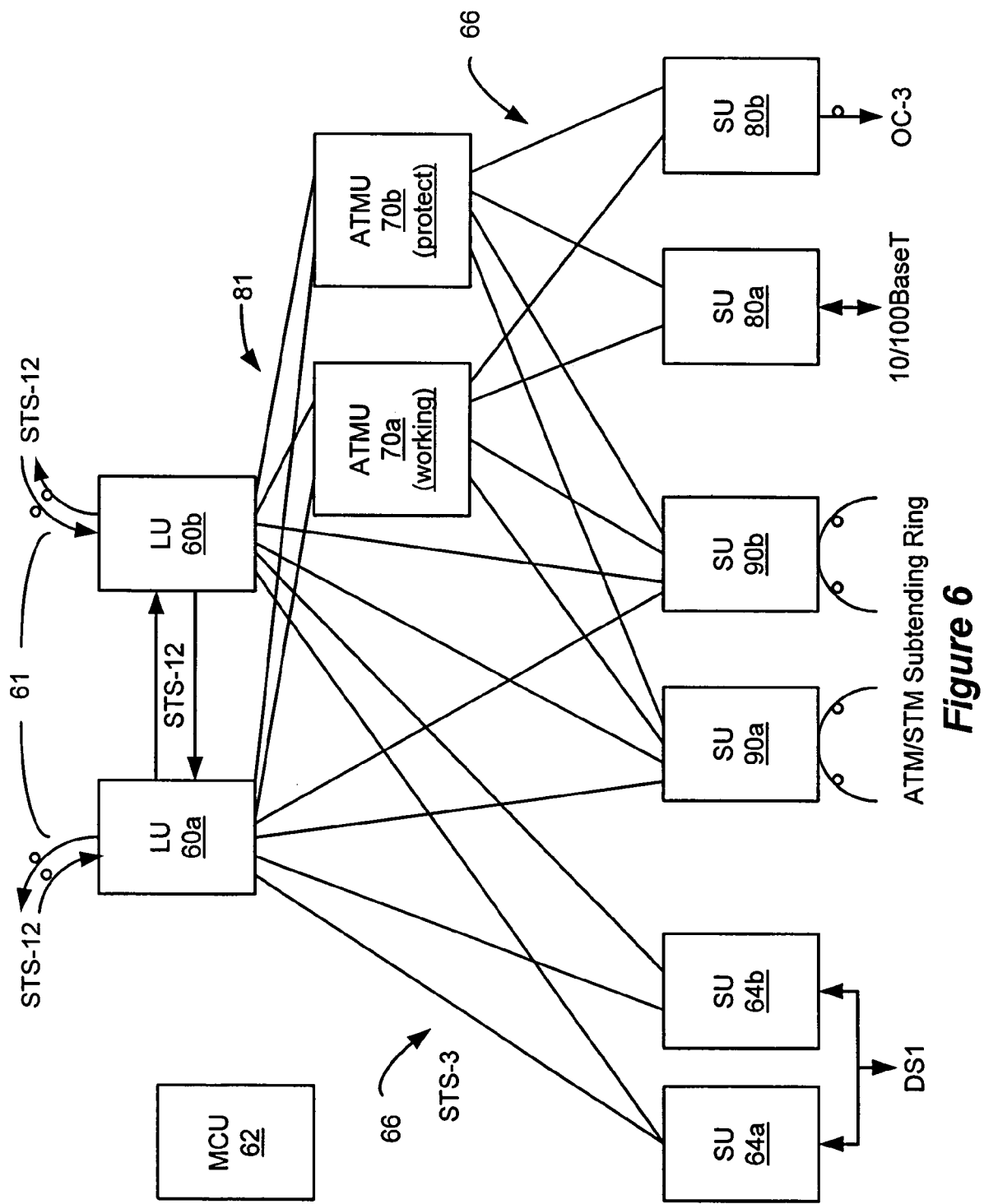
FIG. 6 shows an illustrative configuration of the disclosed network element providing asynchronous transfer mode (ATM) support and synchronous transfer mode (STM) support.

FIGS. 4 through 6 illustrate various system configurations that may be obtained using the presently disclosed architecture. The disclosed network element can be configured as an STM system as shown in FIG. 4, an ATM system as in FIG. 5, or an STM/ATM hybrid system as shown in FIG. 6, depending on the complement of units which are employed.

The exemplary configurations of FIGS. 4-6 include the following hardware components:

1) line units (LUs) 60*a* and 60*b*, which operate as an active/standby pair, each of which terminates a SONET ring, for example through an OC-12 connection.

2) a number of service units (SUs), illustrated by the following specific examples:

STM Service Units 64, which map STM services provided by the device to their respective STM service interfaces. Similarly, ATM subtending ring service units 80*e* and 80*f* provide a service side interface to a SONET ring carrying ATM cells, and STM/ATM subtending ring service units 90*a* and 90*b* provide a service side interface to a SONET ring carrying both STM and ATM traffic.

Service units 90*a* and 90*b* may also be referred to as "Hybrid Service Units", because they provide both STM and ATM services to their respective service interfaces. A hybrid service unit includes three interfaces: an STM internal interface (to the STM switch fabric), an ATM internal interface (to the ATM switch fabric), and a service interface. During operation of a hybrid service unit, data units such as packets or cells are forwarded from the interface at which they are received to either of the other interfaces. Such forwarding is performed by one or more application specific integrated circuits (ASICs) and/or a microprocessor based subsystem. For example, in another illustrative embodiment, an Ethernet hybrid service unit is provided. In the Ethernet hybrid service unit, data units carried in Ethernet frames are received at an Ethernet service interface, and are selectively forwarded to either the STM or the ATM interfaces, based on information such as addressing included within the header of each received Ethernet frame. Similarly, each data unit received at the ATM or STM internal interfaces may be forwarded to either the other internal interface, or to the Ethernet service interface, responsive to information contained within each data unit, or to provisioning of individual signals. Hybrid service units may include any suitable external service interfaces to the device, including but not limited to data communications network, such as Ethernet or ATM, or any traditional telecommunications system, such as the digital multiplex hierarchy (DMH) or SONET.

ATM Interworking Service Units 80*a*, 80*c* and 80*d*, which adapt traditional datacom (10/100BaseT for example) or telecom (OC-3 or DS-1 for example) service interfaces to the ATM protocol.

Native ATM Service Unit 80*b*, which provides an interface to the ATM services provided by the device to an ATM service interface, for example an OC-3 based cell relay connection.

3) ATM switch fabric units (ATMUs) 70*a* and 70*b*, which form an active/standby pair, and which handle ATM VP/VC switching and other activities associated with ATM cell relay, such as signaling, routing, call control, and traffic management.

4) A Management and Control Unit (MCU) 62, which manages and controls the units within the network element 10. This unit provides all the administrative interfaces to the device and processes all the SONET overhead bytes.

The STM system of FIG. 4 includes the two LUs 60*a* and 60*b*, the MCU 62, and some number of STM service units 64*a*-64*e*. Service units 64*a* and 64*b* are an active/standby pair supporting a SONET DS-1 service interface, service units 64*c* and 64*d* are an active/standby pair supporting a SONET DS-3 service interface, and service unit 64*e* supports a SONET OC-3 service interface. The line units 60*a* and 60*b* attach via OC-12 to a SONET ring 61. During operation of the embodiment shown in FIG. 4, STM signals are routed by the STM switch fabric in the active one of the line units 60, between the ring 61 and active ones of the service units 64 over individual ones of point to point STS-3 serial links 66.

FIG. 5 shows an ATM configuration of the disclosed network element, including the two LUs 60*a* and 60*b*, the ATMUs 70*a* and 70*b*, the MCU 62 and ATM service units 80*a* through 80*f*. The ATM Interworking service unit 80*a* includes a service interface to a 10/100BaseT LAN, the native ATM service unit 80*b* includes a service interface to an OC-3 based cell relay connection, and a pair of ATM Interworking Service Units 80*c* and 80*d* include service interfaces to a DS-1 frame relay connection. The service units in FIG. 5 are connected via an active/standby pair of ATMUs 70*a* and 70*b* to a pair of OC-12 LUs 60*a* and 60*b*. The service units 80*c* and 80*d* are configured as an active/standby pair. The ATM subtending ring service units 80*e* and 80*f* provide a service side interface to a SONET ring carrying ATM cells.

During operation of the embodiment shown in FIG. 5, ATM cells carried over STS signals within the SONET ring 61 are routed by the line units 60*a*-60*b* over STS-12 datapath connections 81 to each of the ATM switch fabrics within the ATM switch fabric units 70*a* and 70*b*. The ATM switch fabric units 70*a* and 70*b* in turn direct the ATM cells, based on VPI/VCI values within the cell headers, to the appropriate destination service units as indicated by ATM virtual connections established through the ATM switch fabric.

A hybrid STM/ATM configuration of the disclosed network element is shown in FIG. 6. In FIG. 6, the STS signals from the ring 61 which contain encapsulated ATM cells are routed by the line units 60*a*-60*b* to the ATM switch fabric units 70*a*-70*b*. STS signals from the ring 61 that are provisioned to pass through service interfaces of the device are routed by the line units 60*a*-60*b* to the appropriate service units using the STM switch fabrics contained within the line units 60*a*-60*b*. The service units 64*a*-64*b* communicate STM frames with the line units 60*a*-60*b*, while the service units 80*a*-80*b* communicate ATM cells with the ATM switch fabric units 70*a*-70*b*. The service units 90*a*-90*b* communicate ATM cells with the ATM switch fabric units 80*a*-80*b*, and also communicate STM frames with the line units 60*a*-60*b*.

Figure 7:
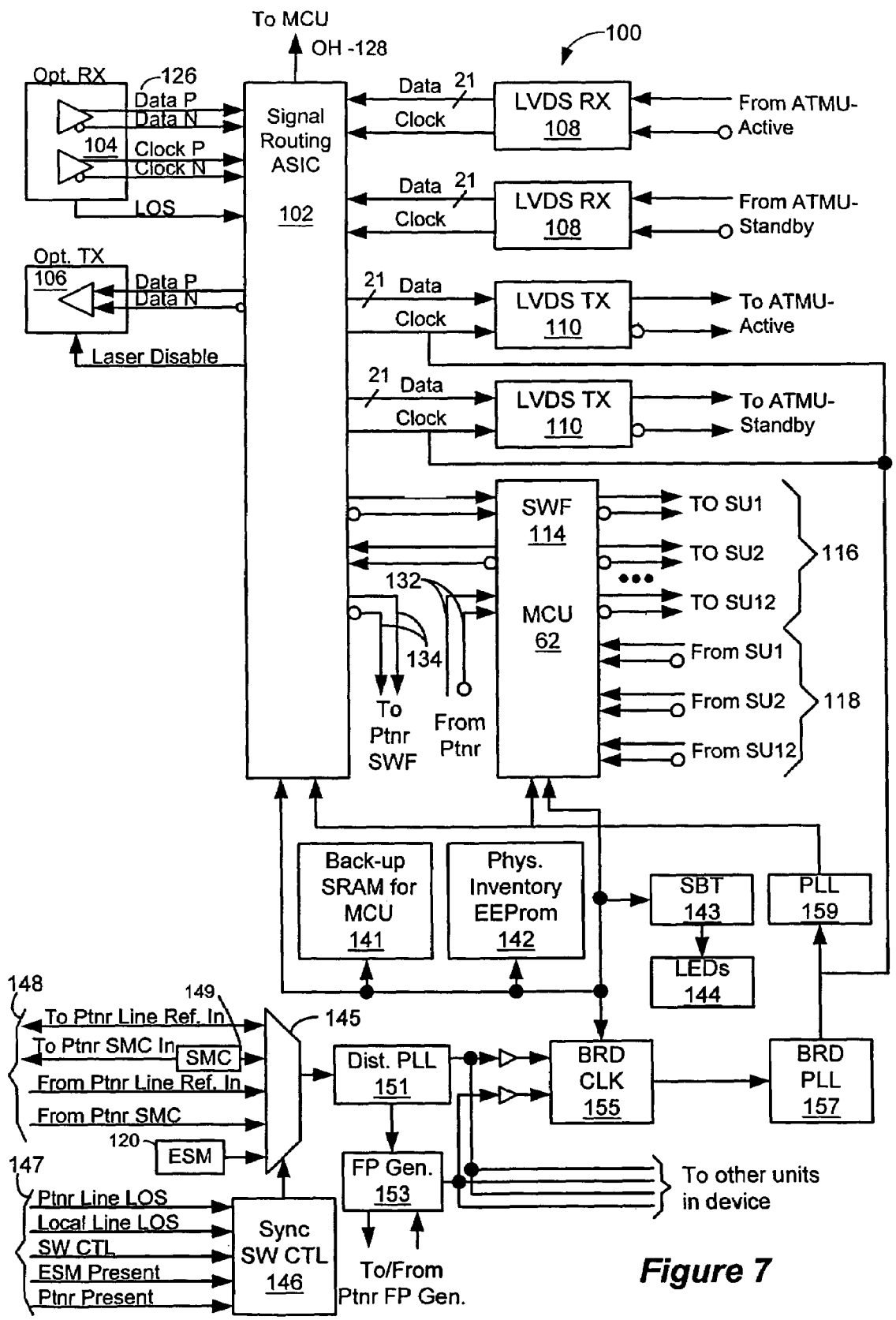
FIG. 7 is a functional block diagram of an illustrative line unit employed in the presently disclosed network element.

FIG. 7 is a functional block diagram of an illustrative line unit 100. The line unit 100 provides an optical interface to a SONET ring at the line side of the disclosed network element. The line unit 100 is shown including a signal routing ASIC 102, which is coupled to an optical receiver 104, an optical transmitter 106, ATMU Low Voltage Differential Signaling (LVDS) receivers 108, ATMU transmitters 110, and an STM switch fabric ASIC 114. ATMU transmitters 110 and ATMU receivers 108 are, for example, shown using LVDS devices. The STM switch fabric ASIC 114 is shown including service unit transmit interfaces 116 and service unit receive interfaces 118.

During operation of the line unit 100, the optical receiver 104 receives for example a SONET formatted OC-12 or OC-3 optical signal, carrying an STS-12 or STS-3 signal respectively, or any suitably formatted signal. The optical receiver 104 passes electrical clock signals 124 and data signals 126 that reflect the received SONET signal to the signal routing ASIC 102. The signal routing ASIC 102 extracts STS frames from the STS signal, performs pointer interpretation to locate the beginnings of payloads and virtual tributaries within the received frames, and also extracts line, section and path overhead data. The extracted overhead data 128 is sent by the signal routing ASIC 102 to a management and control unit (MCU) for further processing.

According to provisioning information provided to the line unit 100 by the MCU, the signals in the received STS signal are interpreted by the line unit 100 as carrying either ATM or STM traffic. The STS-1 signals provisioned as ATM traffic are processed by the line unit 100 to perform the ATM Transmission Convergence (TC) layer functions of cell delineation and STS channel identification. The resulting ATM cells are then formatted into a cell stream and sent to the active and standby ATM switch fabric units, via transmitters 110.

The STS signals received by the line unit 100 that carry STM traffic are sent by the signal routing ASIC 102 via connections 130 to the STM switch fabric ASIC 114, where STS/VT grooming and cross-connection takes place. The switch fabric ASIC 114 is further coupled via connection 132 to receive STM traffic from a signal routing ASIC of a "partner" line unit in an active/standby pair. Similarly, the output connection 134 of the signal routing ASIC 102 is used to pass STM traffic to the switch fabric of the partner line unit.

The switch fabric ASIC 114 receives STM traffic from the line side of the device through one of the two connections 130 and 132, each of which for example provides full STS-12 bandwidth, and from the service side through service unit receive interfaces 118, each of which for example provides STS-3 bandwidth. The switch fabric ASIC 114 outputs STM signals through the output 135 (STS-12) or any of the service unit transmit interfaces (STS-3) 116.

Further during operation of the line unit 100 as shown in FIG. 7, the switch fabric ASIC 114 performs Unidirectional Path Switched Ring (UPSR) path selection, responsive to path performance information provided by the signal routing ASIC 102, and passed to the switch fabric ASIC 114 within some number of over-written overhead bytes, in order to determine which of the connections 130 or 132 should be the path for individual STS or VT signals that are dropped at the service side of the device. The switch fabric ASIC 114 performs this selection in response to path performance criteria, in order to determine the path of highest quality from the two available paths. The switch fabric ASIC 114 performs this selection at either the STS-1 or VT 1.5 level for each path dropped to the service side of the device.

The line unit 100 also includes a back-up memory 141 which stores configuration information that may be used in the event of a failure of the MCU. The contents of the back-up memory 141 may also be used by a new MCU that is installed to replace the failed unit. The physical inventory EEPROM 142 is used to store information such as the serial number of the unit, a hardware revision number, and a software revision number. A serial bus terminator SBT 143 operates to connect the unit to the serial hardbus for communication with the MCU, and 144 provide a visual indication of the unit's status.

The line unit 100 further includes various clock related elements including an extended synchronization module (ESM) 120, which, in combination, provide STM synchronization clocks to the line unit and other units within the device. Specifically, a timing reference switch 145 is controlled by the output of synchronization switch controller logic 146. A number of inputs 147 to the synchronization switch controller logic 146 provide indication of whether the ESM 120 is present, whether the active/standby partner line unit is present, and whether the SONET signal on the line side is present on either the local or partner line unit.

The inputs 148 to the timing reference switch 145 include a SONET minimum clock (SMC) 149 generated by a clock source on the line unit, and a local line reference clock from the signal routing ASIC 102, that is derived from the line side SONET ring. SMC and line reference signals are also provided to the timing reference switch 145 from the partner line unit as well. When the ESM daughter board is present, the reference signal from the ESM is always selected to pass through the timing reference switch 145.

The output of the timing reference switch 145 is passed to distribution phase locked loop 151 which smoothes out any switching transients and converts the selected timing reference to a higher distribution frequency that is passed to the other units in the device, as well as to frame pulse generation logic 153. The frame pulse generation logic 153 derives a frame pulse from the distribution frequency and passes that frame pulse to the other units in the device, as well as to the frame pulse generator of the partner line unit. The distribution frequency is also received by the board clock logic 155, and passed to phase locked loops 157 and 159 for further frequency conversion to obtain frequencies needed to support the ATM and STM protocols within the logic of the signal routing ASIC 102 and switch fabric ASIC 114.

Figure 8:
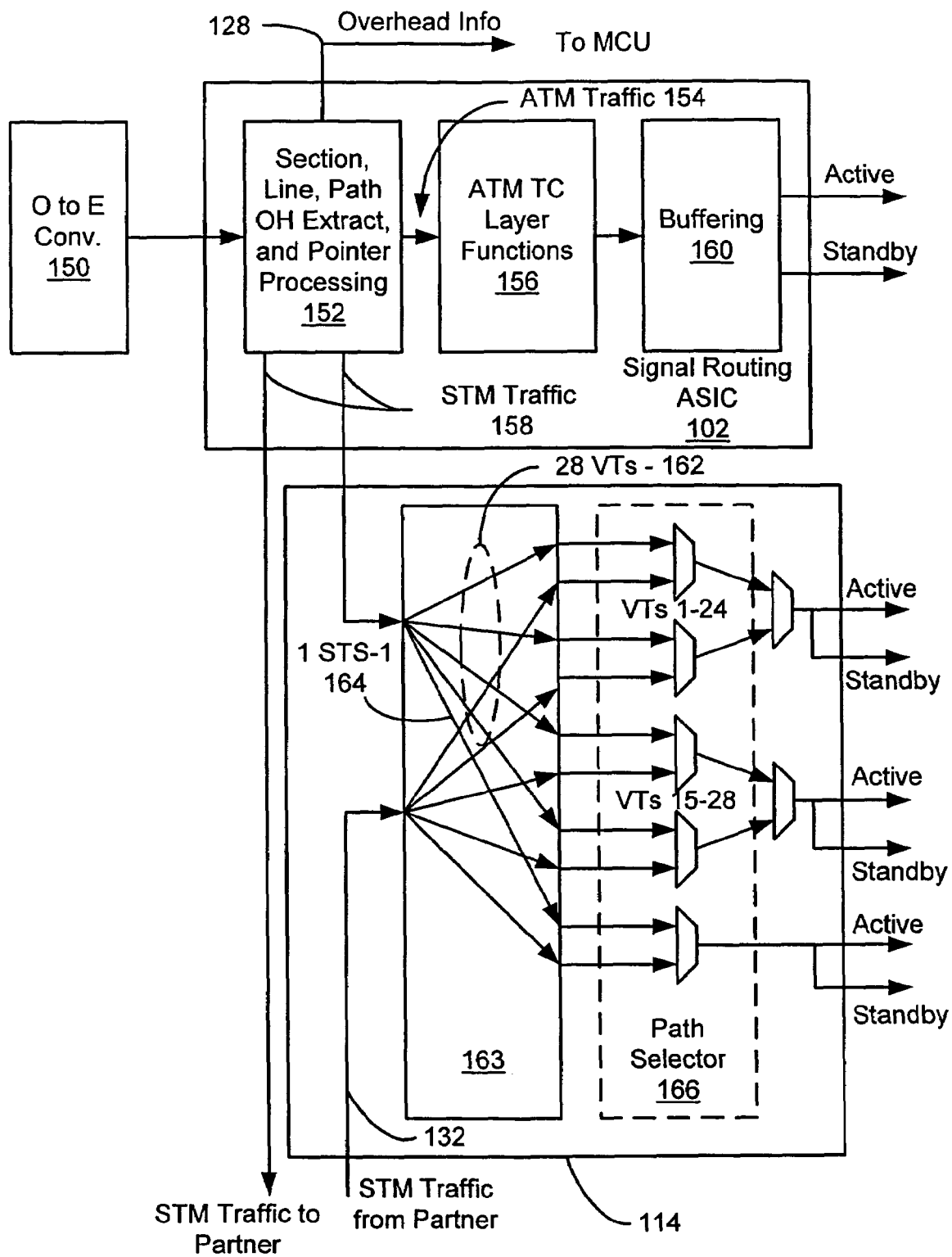
FIG. 8 is a block diagram illustrating the STM and ATM inbound datapath within the line unit.

FIG. 8 is a block diagram illustrating the operations performed in the STM and ATM inbound datapaths within the line unit 100 of FIG. 7. An incoming SONET signal is first converted from optical to electrical signals (OC-12 to STS-12 for example) by optical to electrical conversion circuit 150. The output of the circuit 150 is passed to the signal routing ASIC 102, which performs section, line and path overhead extraction, as well as STM and VT pointer processing in a first functional block 152. In response to provisioning information, the functional block 152 separates ATM and STM traffic contained within the received SONET signal. A first output of the functional block 152 is ATM traffic 154 extracted from the received SONET signal, which is passed to a second functional block 156 within the signal routing ASIC 102. A second output of the functional block 152 is STM traffic 158 extracted from the received SONET signal, which is passed to both the STM switch fabric of the partner line unit, and also to the local switch fabric ASIC 114. A third output of the functional block 152 is the extracted SONET overhead information 128, which is passed to the MCU.

The signal routing ASIC 102 further provides path selection control information to the switch fabric ASIC 114, as well as to the ATM switch fabric units. Such information reflects monitoring of incoming path performance by the signal routing ASIC 102, for example through bit error monitoring, AIS (Alarm Indication Signal) monitoring, alarm detection, and or path label monitoring. The path selection information provided to the switch fabric ASIC 114 may be at the STS signal or VT level. Path selection information at the STS level is provided by writing a path status value over an STS line overhead byte within the STS signal. The status value reflects which of the input paths to the switch fabric ASIC 114 is to be used to receive the particular STS signal associated with the line overhead byte. The line overhead byte may be overwritten by the signal routing ASIC because it has previously extracted the line overhead and sent it to the MCU, prior to forwarding of the signal to the switch fabric ASIC 114. For VT specific path selection information, the signal routing ASIC 102 overwrites one of the VT pointer bytes for the corresponding VT with path status information. The VT pointer byte may be overwritten by the signal routing ASIC 102 because it has previously performed VT (as well as STM frame) pointer processing. In this way STM traffic 158 carries path selection information to the STM switch fabrics of both the local and partner line units. The signal routing ASIC 102 must align the STM traffic 158 with the STM traffic 132 received from the signal routing ASIC of the partner line unit prior to reception by the switch fabric ASIC 114. Such alignment must ensure that STS signals received by the switch fabric ASIC 114 are frame aligned for STS signals, and frame and SPE aligned for VTs.

The path selection control information provided by the signal routing ASIC 102 to the active and standby ATM switch fabric units is similarly reflective of incoming path performance and availability monitoring as described above. The path selection control information for the ATM switch fabric unit is output from the signal routing ASIC 102, and transmitted as part of a serial data stream including an ATM cell stream to each of the ATM switch fabric units. The path selection information so provided is used by the ATM switch fabric units to perform ATM VP path selection.

The second functional block 156 in the signal routing ASIC 102 formats the ATM traffic 154 into an ATM cell stream. The resulting cell stream is stored in the output buffer 160 for transmission to the active and standby ATM switch fabric units. While the output buffer 160 is shown for example within the signal routing ASIC 102 in FIG. 8, they may also be implemented externally to the signal routing ASIC 102.

The STM traffic 158 from the signal routing ASIC 102 is received by the switch fabric ASIC 114, where the STS-1 signals it contains are groomed for the type of traffic they are carrying. For example, a VT mapped STS-1 signal in the STM traffic from the signal routing ASIC is broken up into 28 VTs 162, which are organized into two sets of 14 VTs. Each set of 14 VTs is received from both the local STS switch fabric 163 and the partner STM switch fabric by the path selector logic 166 for subsequent broadcast to an active/standby service unit pair. In addition, an STS-1 signal 164 in the STM traffic from the local and partner signal routing ASICs is shown for purposes of example being passed to the path selector logic 166, also for subsequent broadcast to an active/standby service unit pair.

The path selector logic 166 selects the best receive path between the path from the local STM switch fabric, and the path 132 from the STM switch fabric in the partner line unit, in response to in-band path selection information provided by the signal routing ASICs 102 of both the active and standby line units. The path selection information is contained within overwritten overhead bytes in each particular STS or VT signal. The outputs of path selector logic 166 are then combined by multiplexers 167 for STS-3 transmission to the appropriate service units.

Figure 9:
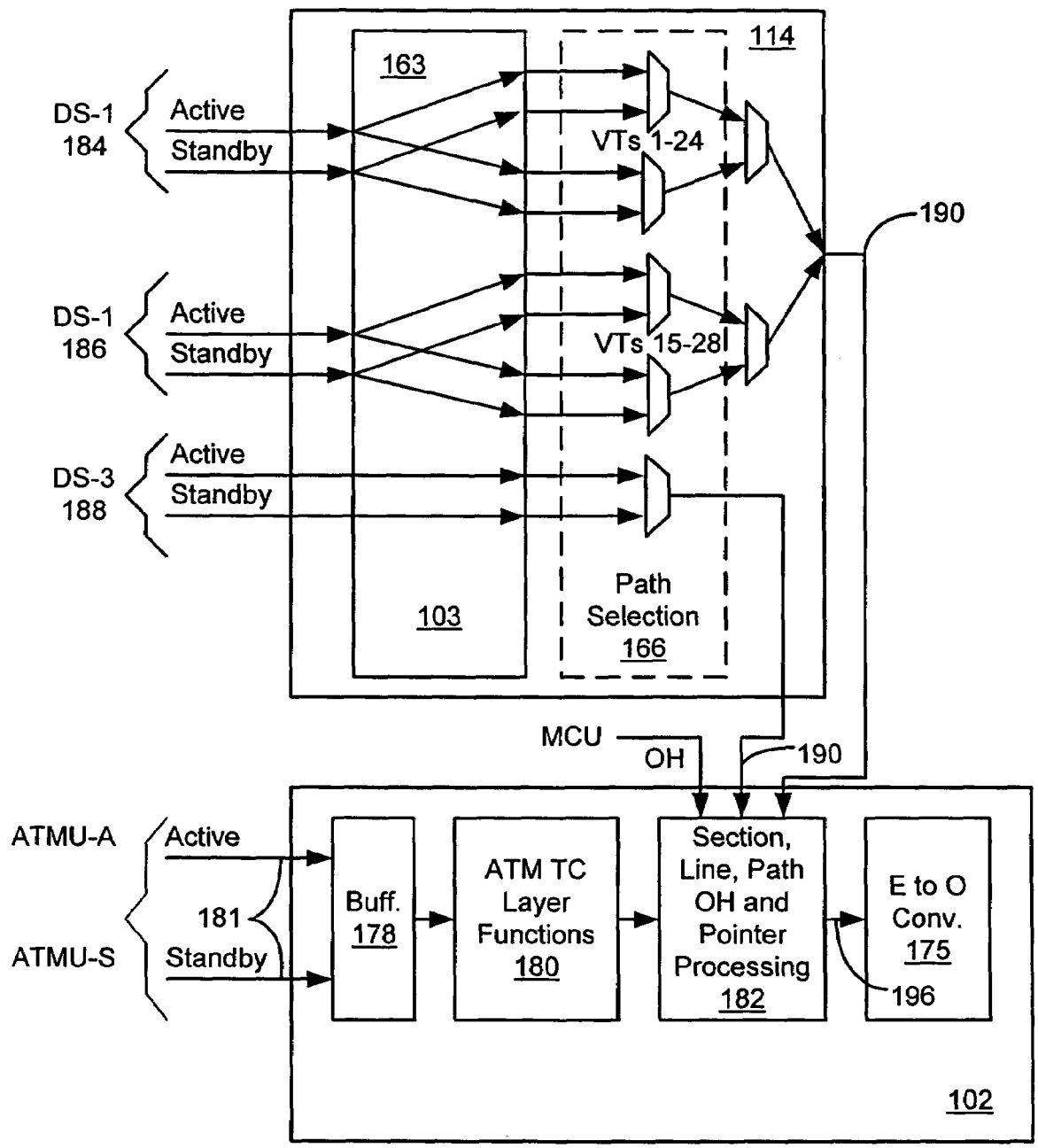
FIG. 9 is a block diagram illustrating the STM and ATM outbound datapath within the line unit.

FIG. 9 is a functional block diagram illustrating operations performed in the STM and ATM outbound datapaths within the illustrative line unit 100 of FIG. 7. FIG. 9 shows outbound datapath operation for a line unit provisioned to insert 1 VT-mapped STS-1 signal 190, one DS-3 mapped STS-1 signal 192 and one ATM mapped STS-1 signal 194 onto an outgoing STS-12 signal 196, which is converted to OC-12 by electrical to optical conversion circuit 175. The 28 VTs of the VT-mapped STS-1 signal 190 are received from two separate active/standby pairs of DS-1 service units 184 and 186. The DS-3 source of the DS-3 mapped STS-1 is an active/standby pair of DS-3 service units. The ATM mapped STS-1 signal 194 is received by the line unit 100 via cell streams 181 from the active/standby ATM switch fabric units within the device.

The 28 VTs from service units 184 and 186 pass through STS switch fabric 163 to path selector logic 166 where selection between active or standby service unit sources is performed in response to path selection information contained within the respective VT and STS signals received from the service units. In an illustrative embodiment, each one of the service units includes a signal routing ASIC such as signal routing ASIC 102, which embeds path selection information within each VT or STS signal in response to path performance and availability monitoring.

The 28 VTs are then multiplexed onto a single STS-1 signal 190 by multiplexers 169, and passed to the signal routing ASIC 102. The DS-3 mapped STS-1 also goes through the STS switch fabric 163 to path selectors within path selector logic 166, also for selection between active or standby service unit sources. The DS-3 mapped STS-1 is then passed as STS-1 signal 192 to the signal routing ASIC 102.

Receive buffers 178 within the signal routing ASIC 102 receive the two ATM cell streams 181 from the active and standby ATM switch fabric units (ATMU-A and ATMU-S). While the receive buffers 178 are shown within the signal routing ASIC 102 in FIG. 9, they may also be provided externally to the signal routing ASIC 102. A parity bit is included with each cell stream, and is used by the signal routing ASIC 102 to monitor the quality of the paths carrying the cell streams to the signal routing ASIC 102. One of the cell streams 181 is selected, responsive to path quality information, to pass from receive buffering 178 to a first logic block 180. Within the logic block 180, ATM Transmission Convergence layer functions are performed, the cell stream is delineated, and the STS routing tags are stripped off. The resulting ATM-mapped STS-1 signal 194 is then processed by functional block 182, and multiplexed onto the line side SONET ring with the other STS-1's 190 and 192. Section, line, and path overhead information are inserted as necessary, and the combined traffic is sent to the electrical to optical conversion circuit 175 for optical transmission onto the SONET ring. For example, STM traffic 190 and 192 includes path overhead information carried through the STM switch fabric, and requires line and section overhead to be inserted by the signal routing ASIC 102. ATM traffic 194 requires path, line and signal overhead bytes to be inserted by the signal routing ASIC 102.

Figure 10:
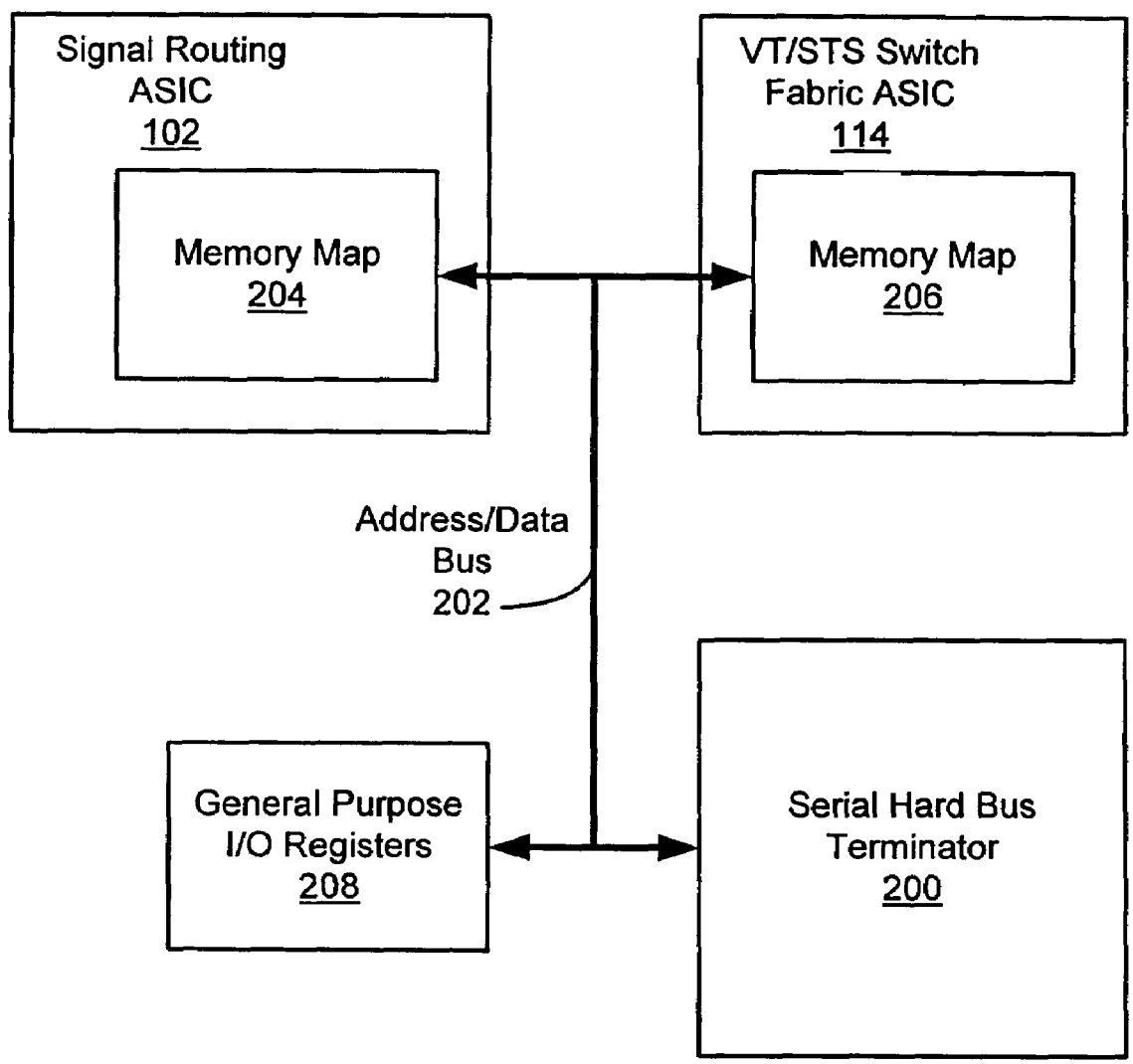
FIG. 10 is a block diagram of a control architecture for the line unit.

An illustrative control architecture for a line unit is shown in FIG. 10. FIG. 10 shows a serial hardbus terminator 200 coupled to an address/data bus 202. A number of general purpose I/O registers 208 are further coupled to the address/data bus 202, and made accessible to the MCU over the serial hardbus via the serial hardbus terminator logic 200. A memory map 206 consisting of accessible registers in the switch fabric ASIC 114, and a memory map 204 consisting of accessible registers in the signal routing ASIC 102 are also made accessible to the MCU via the serial hardbus terminator logic 200. During operation of the line unit, the MCU provides provisioning information through the serial hardbus to the line unit. The provisioning information determines the operation of the signal routing ASIC 102 and switch fabric ASIC 114. For example, provisioning information from the MCU controls how the switch fabric ASIC 114 routes STS signals it receives, and determines which of the STS signals on the line side SONET ring are treated as containing ATM cells. In addition, the MCU detects failures and error conditions through interrupts received over the serial hardbus. In response to detection of such failures and error conditions, the MCU provides path selection information to the line unit over the serial hardbus, for example determining which one of an active/standby pair of service units is to be the source for a particular VT at any given time.

Figure 11:
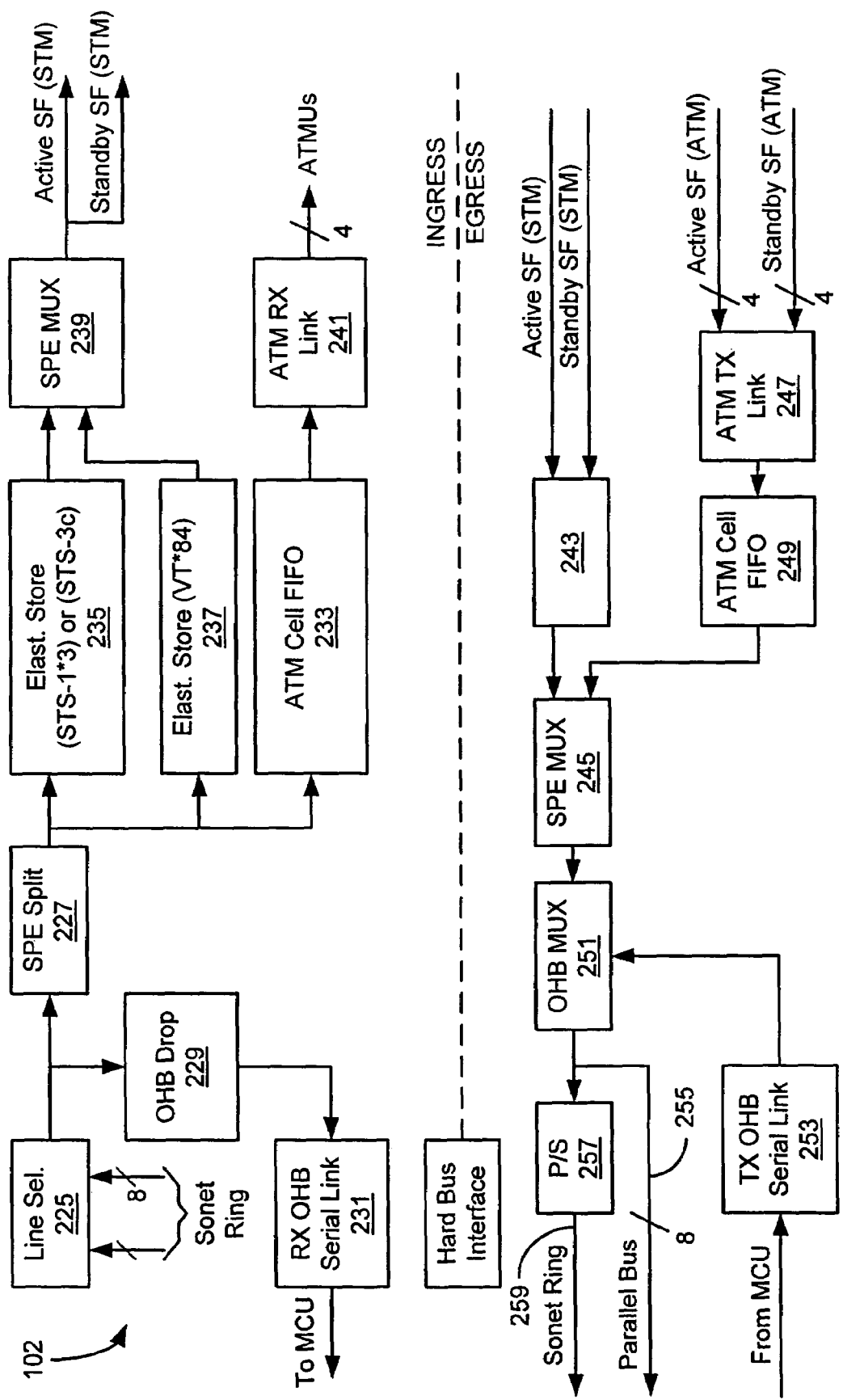
FIG. 11 is a block diagram of a signal routing ASIC.

FIG. 11 shows an illustrative embodiment of the signal routing ASIC 102 provided within the line unit, and which may also be provided within a service unit. The signal routing ASIC 102 is capable of receiving data from and transmitting data to optical drivers that interface to a SONET ring on the line side or the service side of the device. The signal routing ASIC 102 further contains an ATM interface for processing ATM cells, such as are communicated between a line unit and an ATM switch fabric unit. Finally, the signal routing ASIC 102 includes an STM interface for transmitting data to and receiving data from an STM switch fabric ASIC.

The signal path for data received by the signal routing ASIC 102 from the SONET ring is first described. Data received from the SONET ring is converted from an optical signal to an electrical signal by an optical receiver outboard of the signal routing ASIC 102, and is serially coupled to one input of a line selector 225 within the signal routing ASIC 102. In a preferred embodiment, the serial input to the line selector 225 comprises a 155 megabit per second unidirectional path. The signal at the serial input to the line selector 225 may for example be 1 STS-3c signal, 3 STS-1 signals, 84 VTs, or any combination of STS-1 and VT signals within the specified signaling bandwidth.

The signals received from the SONET ring are passed from the output of the line selector 225 to both a synchronous payload envelope (SPE) splitter 227, and an overhead bit drop (OHB) recovery circuit 229. Overhead bits carried on the received STM signal are segregated by the OHB recovery circuit 229 and coupled to a RX OHB Serial Link interface 231. In a preferred embodiment, the RX OHB Serial Link interface 231 transmits the overhead bits of the signals on the SONET ring over a 9.72 mbps serial link to the MCU for processing.

The SPE splitter 227, in response to previously received provisioning information from the MCU, extracts STM, VT, and/or ATM traffic streams from the STS signals on the SONET ring, and passes each one of these traffic streams into a respective one of three elastic stores. In the case of ATM traffic, the ATM cells are unencapsulated prior to being stored in the ATM cell FIFO 233.

More specifically, the output of the synchronized payload envelope splitter 227 is coupled to three elastic stores. The elastic stores are fabricated as first in first out storage (FIFOs) and serve a rate decoupling function. In the preferred embodiment, the first elastic store 235 receives STS-1 and STS-3c traffic and is used to perform rate decoupling for such traffic. The second elastic store 237 receives VT traffic. The third elastic store is an ATM cell FIFO 233, and is employed to provide rate decoupling for ATM cell traffic. Outputs of the of the first and second elastic stores 235 and 237 are coupled to a synchronized payload envelope multiplexer (SPE MUX) 239, which is employed to multiplex the various STS signals to the STM switch fabrics on each of the active/standby line unit pair. The output of the SPE MUX 239 is broadcast to the STM switch fabrics on both active and standby line units in the event two such cards are provided for purposes of redundancy.

The output of the ATM cell FIFO 233 is coupled to the ATM receive link interface (ATM Rx Link) 241. The output of the ATM receive link interface 241 is coupled to the ATM switch fabric unit via a four bit wide parallel data bus which is clocked at 39 Mhz to a 156 Mb/s bandwidth between the signal routing ASIC and the ATM switch fabric. Since, in the illustrative embodiment of FIG. 11, the bandwidth between the signal routing ASIC 102 and the ATM switch fabric unit exceeds the ingress bandwidth of 155 Mb/s, the ATM cell FIFO 233 cannot overflow. In the foregoing manner, ingress SONET traffic carrying STS-1, STS-3c, VT or encapsulated ATM cells is forwarded to either an STM or ATM switch fabric as applicable.

Data destined for the line side SONET interface is received by the signal routing ASIC 102 from either the STM switch fabric or the ATM switch fabric. More specifically, an active/standby switch 243 receives STM data from both a first STM switch fabric, for example which is co-resident on the local line card, as well as from a second STM switch fabric, for example located on a separate line card, in the event the separate line card is present and configured with the first line card as a redundant pair. The active/standby switch 243 is controlled by provisioning information received from the MCU to select STM data from one of two STM switch fabrics to which is it coupled. The selected STM data is passed to an SPE multiplexer 245.

Similarly, ATM cells destined for a SONET interface of the device are received at an ATM Transmit Link interface 247 either from a single ATM switch fabric or from two ATM switch fabrics (active and standby) in the event that two ATM switch fabrics are provided in a redundant configuration. In a preferred embodiment, ATM data is received from the respective active/standby ATM switch fabrics over a 4 bit wide parallel interface running at approximately 39 mbps. The ATM data received from one of the active/standby pair of ATM switch fabric units is selected, and passed to the ATM cell FIFO, which performs rate decoupling. The ATM data is then passed on to the SPE MUX 245. The SPE MUX 245 multiplexes the ATM cell data from the ATM cell FIFO 249 together with the STM data from the active/standby switch 243 for subsequent STM transmission.

The output of the SPE MUX is then coupled to an overhead byte multiplexer (OHB MUX) 251. The OHB MUX 251 also receives as an input management and control information, generated by the MCU, via a transmit OHB serial link interface 253 to the MCU. The OHB MUX 251 inserts the received overhead information in the appropriate overhead channels of the resulting SONET signal.

In a preferred embodiment, the output of the OHB MUX 251 is provided both in the form of an 8 bit parallel interface, as well as to a parallel to serial converter 257, which provides a serial output interface 259. The parallel interface to the signal routing ASIC 102 may be coupled to a parallel bus, for example in an alternative embodiment in which the signal routing ASIC is included within a service unit. The parallel data would then be processed as required by the particular service unit. The serial output 259 is illustratively coupled to an electrical to optical converter, as in the preferred embodiment in which the signal routing ASIC is employed within the line units of the device. The optical converter then passes the serial data to the line side SONET interface. In the foregoing manner, the signal routing ASIC 102 is capable of routing STM and ATM formatted traffic between a line side SONET interface, ATM switch unit interface, and STM switch fabric interface.

In an alternative embodiment of the signal routing ASIC 102 shown in FIG. 11, which is designed to support a line side interface to an OC-12 SONET signal, the second elastic store 237 is provided between the first elastic store 235 and the SPE multiplexer 239. Such a configuration allows the second elastic store 237 to utilize the same clock domain as the output of the first elastic store 235 and the input of the SPE multiplexer 239, in order to eliminate the clock jitter effect and reduce the number of gates needed to fabricate the signal routing ASIC 102.

Figure 12:
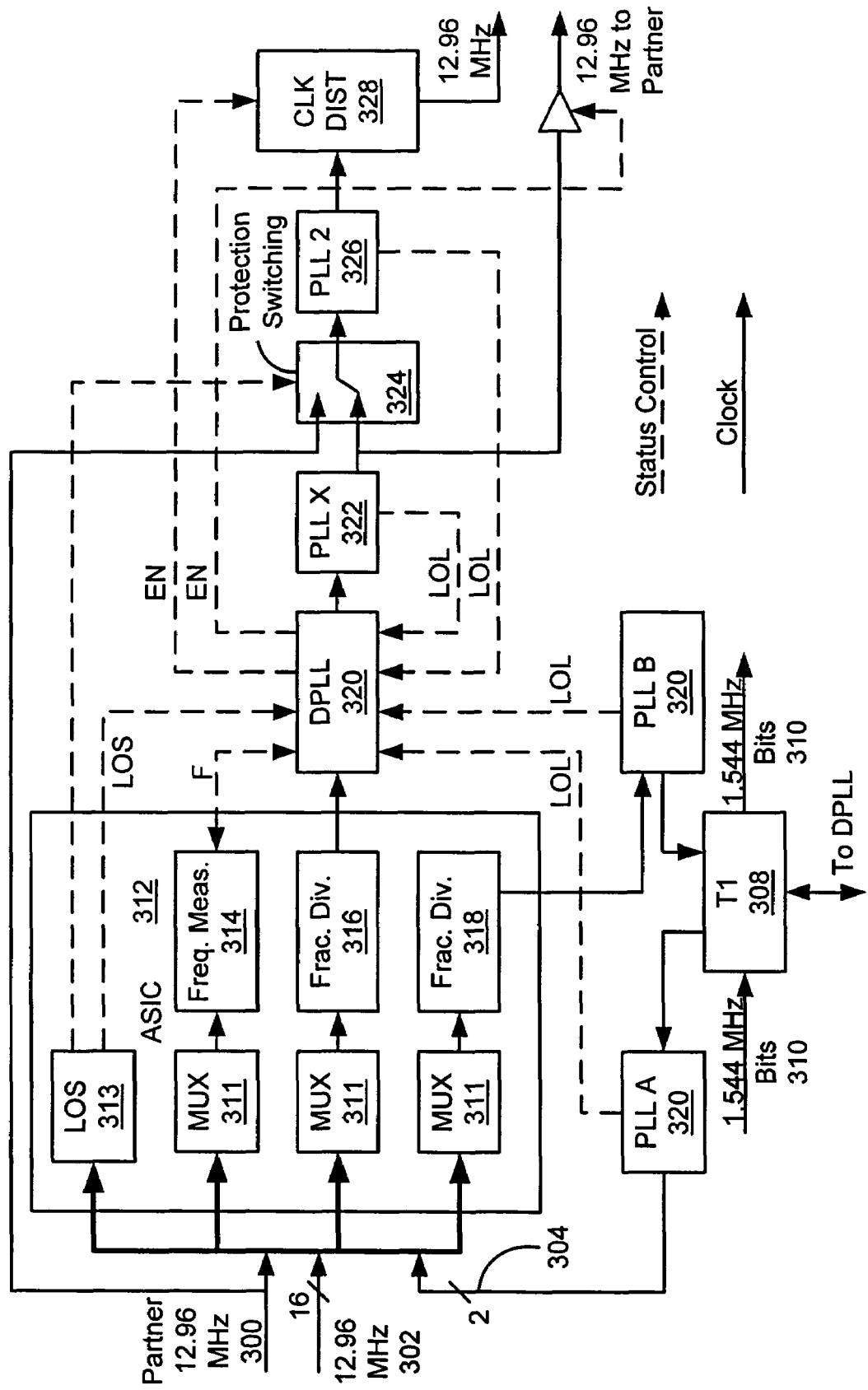
FIG. 12 is a block diagram of an extended synchronization module.

FIG. 12 shows an extended synchronization module (ESM), including a timing source selection ASIC 312. The ASIC 312 is shown having inputs including a 12.96 Mhz clock source 300 from an ESM on a partner line unit, as well as 16 inputs 302 from each service unit in the device. A pair of 1.544 Mhz clocks, which are output from a T1 receiver 308, are also input to the ASIC 312. The T1 receiver 308 is operable to receive an externally generated 1.544 Mhz BITS clock 310.

The ASIC 312 selects one of the input clocks it receives at each of multiplexers 311, and detects which of the input clocks are not present in loss of signal (LOS) circuit 313, and informs the digital phase locked loop 320 of any such loss. The selected clock is passed to frequency measuring logic 314, fractional divider 316 and fractional divider 318 within the ASIC 312. Frequency measuring logic 314 compares the selected clock with a target clock based on its own internal time base. The results of this comparison are passed to the digital phase locked loop 320. The ASIC 312 may select a new clock source using multiplexers 311, in response to feedback control signals from the digital phase locked loop 320.

The fractional divider circuit 316 derives an 8 Khz reference clock from the selected clock source, which is passed to the digital phase locked loop 320. The fractional divider 318 derives a 1.544 Mhz clock from the selected clock source, which is passed to the T1 receiver 308, in order to provide an alternative 1.544 Mhz source to the T1 receiver 308.

The digital phase locked loop 320 generates a 3.24 Mhz clock, that is passed to phase locked loop 322 which converts the signal to 12.96 Mhz. The converted signal is passed to protection switch logic 324 and to any ESM on the partner line unit. The protection switching logic 324 selects between either the 12.96 Mhz clock from phase locked loop 322 or the 12.96 Mhz clock from the ESM of the partner line unit. The selected 12.96 Mhz signal is passed through phase locked loop 326 for smoothing and into clock distribution buffer 328 for distribution to the other units in the device.

Figure 13:
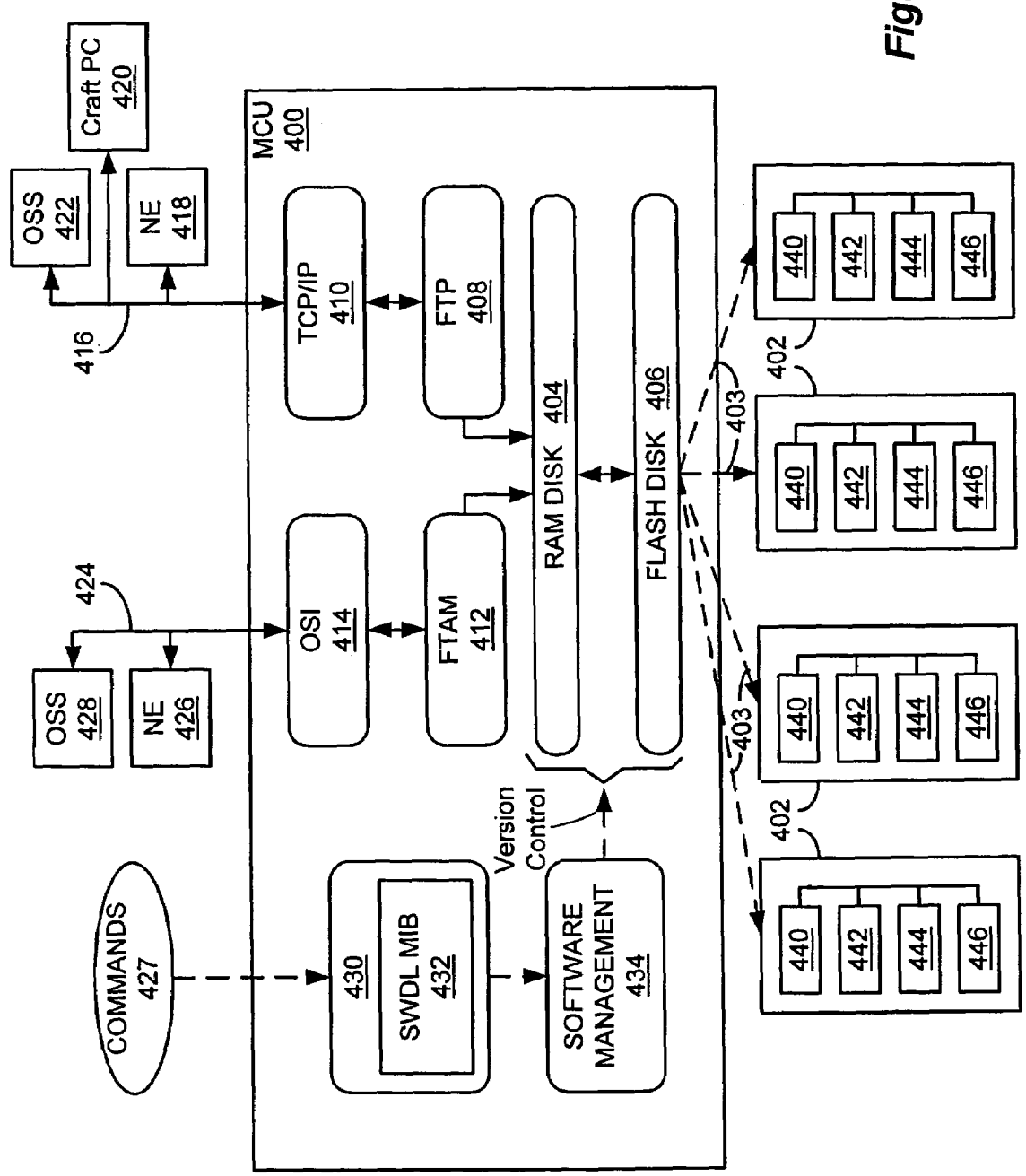
FIG. 13 is a block diagram of software and hardware used to download a software image into a management and control unit.

FIG. 13 shows components for performing a software image download to or from an MCU 400. A craft personal computer (PC) 420, operations support station (OSS) 422, and remote network element (NE) 418 are shown communicably coupled with the MCU 400 via a first communications network 416. A transmission control protocol/internet protocol (TCP/IP) functional unit 410 operates in conjunction with a file transfer protocol (FTP) functional unit 408 to support file transfers between the RAM disk 404, and the OSS 422, craft PC 420, or network element 418.

An Open Systems Interconnect (OSI) protocol stack 414 operates in conjunction with a file transfer access method (FTAM) functional unit 412 to support file transfer between the RAM disk 404 and the OSS 428 network element 426 on a second communications network 424. A download agent 430 operates to maintain a software download management information base (MIB) 432, as well as to process software download commands 427 received by the MCU. A software management agent 434 maintains version control over software images stored in either the RAM disk 404 or the FLASH disk 406. Software image files received by the MCU 400 are copied from the RAM disk 404 to the FLASH disk 406, and then loaded into appropriate ones of service units 402, over serial hardbus connections 403. The service units 402 each receive a respective software image initially into a "standby" RAM 440, and subsequently copy it to an "active" FLASH RAM 442. The image is then copied into storage referred to as the "executable" RAM 444, from which the image may be executed on a microprocessor 446. As the active FLASH RAM 442 and FLASH disk 406 are non-volatile stores, the software images stored within them persist following removal of power from the device.

Figure 14:
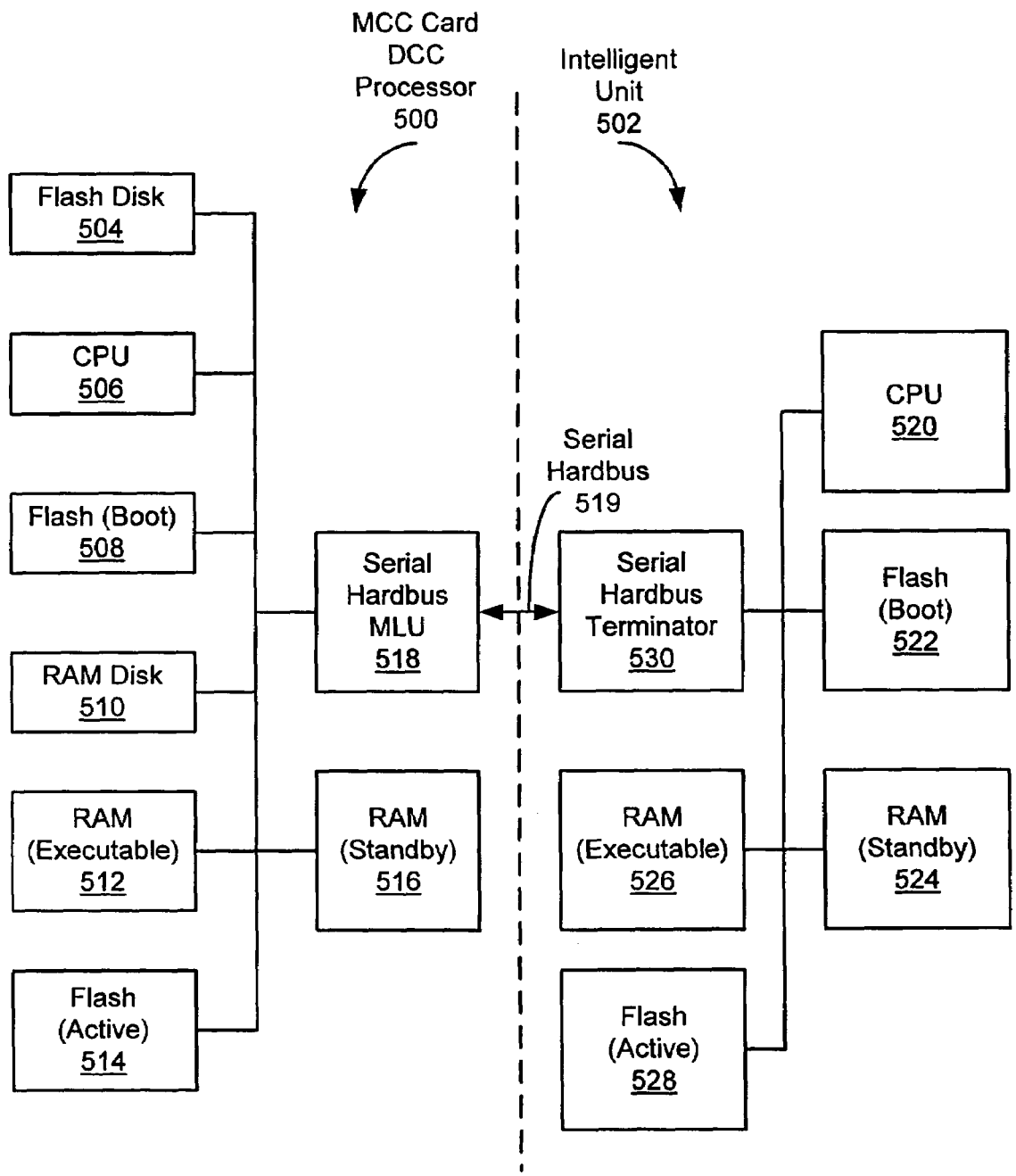
FIG. 14 is a block diagram showing hardware components within a management and control unit and an intelligent service unit.

FIG. 14 shows hardware components within a DCC processor 500 of an MCU card, and within an intelligent service unit 502. The DCC processor 500 includes a FLASH disk 504, CPU 506, "boot" FLASH RAM 508, RAM disk 510, "executable" RAM 512, "active" FLASH RAM 514, "standby" RAM 516, and serial hardbus master logic unit 518. During operation, a software image received by the DCC processor 500 is initially stored in RAM disk 510. The image is then copied to FLASH disk 504. The FLASH disk 504 maintains a software image for the MCU, as well as for each intelligent service unit in the device, and for any ATM processor associated with an ATM switch fabric unit installed in the device. A received software image for the MCU itself is copied from the FLASH disk 504 to the standby RAM 516 and then to the active FLASH RAM 514. The MCU software image is subsequently passed to the executable RAM 512, from which it is executed on the CPU 506.

A software image for the intelligent service unit 502 is copied from the FLASH disk 504 over the serial hardbus 519 to the standby RAM 524 of the intelligent service unit 502, and then to the active FLASH RAM 528 and executable RAM 526. During operation, the software image within the executable RAM 526 is executed on the CPU 520.

Figure 15:
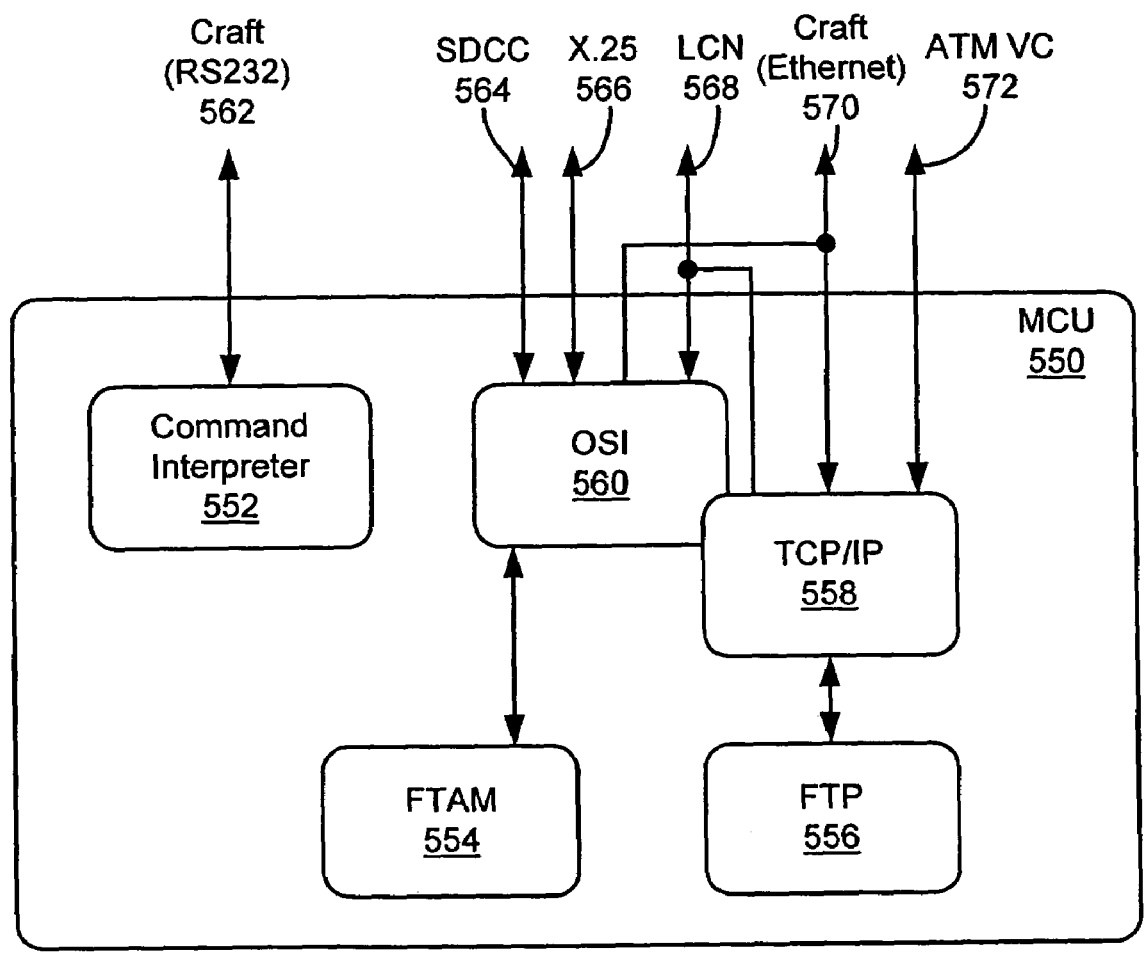
FIG. 15 is a block diagram showing interfaces of a management and control unit.

FIG. 15 shows a number of interfaces to an MCU 550, including an RS232 interface which may be connected to a craft terminal, a SONET overhead connection 564, for receiving SDCC information from a SONET ring connected to the device, an X.25 connection 566, a local communications network (LCN) interface 568, an Ethernet connection 570 to which a craft PC may be connected, and an ATM virtual connection 572 which may be a permanent virtual circuit (PVC). The ATM virtual connection 572 is for example, one of a number of permanent virtual connections provisioned to carry software image data or other maintenance information between MCU 550 and MCUs of other network elements.

During operation of the MCU 550, software image files may be communicated to and from the MCU 550 using an FTP functional unit 556 in conjunction with a TCP/IP functional unit 558, via the ATM VC 572, Ethernet 570, or LCN 568. In addition, software image files may be communicated with the MCU 550 using the OSI stack functional unit 560 and FTAM functional unit 554 via SDCC over the SONET overhead connection 564, or via the X.25 566, LCN 568, or Ethernet 570 interfaces. A command interpreter 552 operates to process Transaction Language 1 (TL1) commands received from a craft terminal over the RS232 connection 562.

Figure 16:
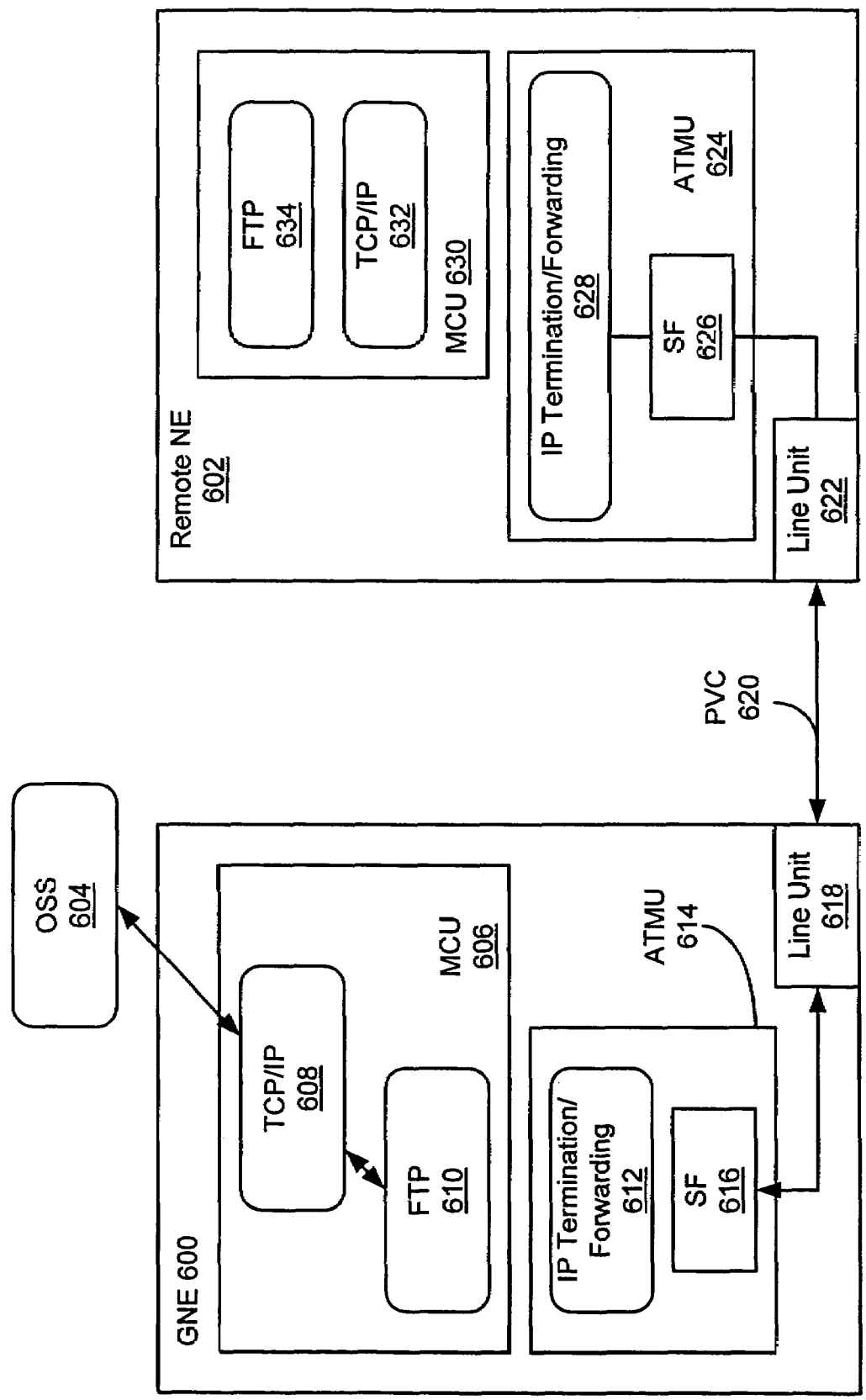
FIG. 16 is a block diagram showing a gateway network element and a remote network element.

FIG. 16 shows a "gateway" network element (GNE) 600, operations support station (OSS) 604, and a remote network element 602. The network element 600 is referred to as a "gateway", for example, because it provides a central management station such as the OSS 604, a connection to a SONET ring to which the remote network element 602 is connected. To initiate a download of a software image from the gateway network element 600 to the remote network element 602, a command is first issued by the OSS 604. Processing of the command results in an FTP request, which causes the FTP functional unit 610 to operate with the TCP/IP functional unit 608 to form a number of IP packets containing the software image. A number of HDLC frames, which contain the IP packets storing the software image, are then passed by the MCU 606 to the ATM switch fabric unit 614. The MCU 606 also passes a VCI/VPI value to the ATM switch fabric unit 614. The VCI/VPI value indicates one of a number of provisioned PVCs that are used to pass software image files from the gateway network element to remote network elements. In a first embodiment, each of the provisioned PVCs connects the gateway network element with one remote network element. In this way a star configuration is formed with the gateway network element as a hub. In a second embodiment, a PVC is provisioned only to the next network element adjacent to the gateway network element. In this alternative embodiment, the software image file is passed from adjacent network element to adjacent network element, until it arrives at an MCU having an IP address matching the destination IP address of the IP packets carrying the software image file. In this way, the software image file is passed from network element to network element. An IP termination and forwarding function 612 in the ATM unit 614, extracts the ATM VCI/VPI value contained in the HDLC frames, and performs segmentation of the file to form ATM cells, for example using a segmentation and reassembly (SAR) unit within the ATM switch fabric unit 614. The IP termination and forwarding function 612 then passes the ATM cells to the switch fabric 616, which determines either that the VCI/VPI value in the cells indicates a permanent virtual circuit (PVC) 620 between the GNE 600 and the remote NE 602 or, alternatively, between the GNE 600 and an adjacent network element, which may or may not be the remote NE 602. The ATM switch fabric 616 forwards the cells over the PVC 620, by way of the line unit 618.

The cells are eventually received by the line unit 622 of the remote network element 602. The line unit 622 forwards the received cells to the switch fabric 626 within the ATM switch fabric unit 624. The switch fabric 626 recognizes that the PVC identified by the VCI/VPI value contained within the cells is terminated in the remote network element 602, and accordingly forwards the received cells to an IP termination/forwarding function 628. The IP termination/forwarding function then employs a segmentation and reassembly unit to reassemble the IP packets from the ATM cells, and forms a number of HDLC frames in which to forward the IP packets to the MCU 630. The MCU 630 then examines the IP destination address in the IP packets, and determines that the IP destination address is an IP address of the MCU 630. The FTP function then loads the software image file within the IP packets into a memory associated with the MCU 630.

Figure 17:
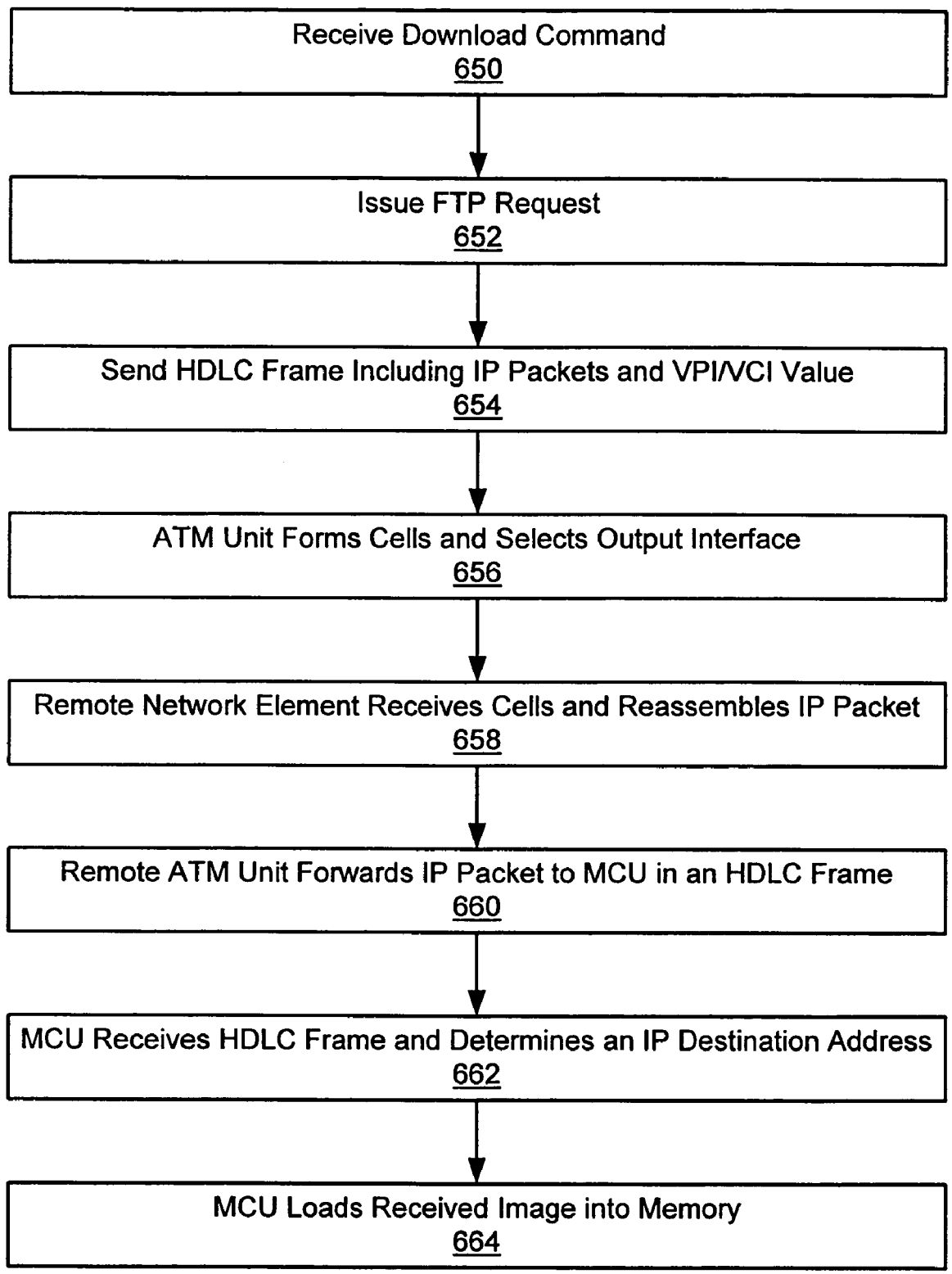
FIG. 17 is a flow chart showing steps performed to download a software image to a network element.

FIG. 17 shows steps performed during downloading of an executable software image from a gateway network element to a remote network element. As illustrated at step 650, a software download command is received by the MCU of the gateway network element. The download command is for example, a TL1 copy-file command which indicates a source of the software image file, as well as the destination network element to which the software image file is to be copied. The download command is for example, received over an interface to the MCU such as an RS232 connection to a craft terminal. Alternatively, the command may be received over an LCN, X.25, Ethernet connection to the MCU, or any other suitable connection. The software image file to be downloaded may, for example, be received within a number of IP packets, or, alternatively over an X.25, LCN, or Ethernet interface to the MCU of the gateway network element.

The download command is processed by software executing in the MCU of the gateway network element, which issues an FTP Request to an FTP functional unit also within the MCU. The FTP functional unit uses a TCP/IP functional unit to form a number of IP packets having IP destination addresses equal to an IP address of an MCU within the remote network element, and containing the software image file indicated in the download command received at step 650. In an alternative embodiment, the IP destination address is a multicast address recognized by each device which uses a common executable software image, and which is being provided a new executable software image by the download being performed.

Software within the MCU of the gateway network element then determines a VCI/VPI value of a permanent virtual circuit (PVC). In a first embodiment, the PVC is between the gateway network element and the remote network element. In an alternative embodiment, the PVC is between the gateway network element and an adjacent network element (which may or may not be the remote network element in which the software image is to be loaded and executed). The MCU software then forms a number of HDLC frames containing the IP packets, as well as the VCI/VPI value of the PVC, and forwards these HDLC frames at step 654, over a serial point to point connection to an ATM switch fabric unit within the local network element.

Upon receipt of the HDLC frames from the MCU, as illustrated at step 656, software within the ATM switch fabric unit employs a SAR unit, also within the ATM switch fabric unit, to form a number of ATM cells having the VCI/VPI value provided from the MCU in their header. The cells are then passed to an ATM switch fabric within the ATM switch fabric unit, which forwards the cells to an output interface of the ATM switch fabric unit associated with the PVC. The selected output interface of the ATM switch fabric unit is, for example, coupled to a line unit within the local network element, which receives the cells, encapsulates them into an STS signal, and transmits them onto a SONET ring.

As depicted at step 658, the remote network element, which is, for example, also coupled to the SONET ring, receives the STS signal containing the ATM cells storing the software image. The remote network element determines that the STS signal contains ATM cells. The remote network element further determines that the STS signal is provisioned such that the ATM cells it contains are extracted and forwarded to an ATM switch fabric unit within the remote network element.

The switch fabric within the ATM switch fabric unit, responsive to the VCI/VPI value in the received cells, forwards the received cells to an IP termination and forwarding functional unit within the ATM switch fabric unit. The IP termination/forwarding unit uses a SAR unit within the ATM switch fabric unit to reassemble the IP packets from the ATM cells. At step 660, the IP packets are then encapsulated into a number of HDLC frames, which are forwarded to the MCU of the remote network element.

At step 662, the MCU of the remote network element receives the HDLC frames containing the IP packets, and compares the destination IP address of those packets with an IP address of the MCU of the remote network element. In response to a match, the MCU software extracts the software image file within the IP packets and loads it into a memory within the MCU at step 664. In the alternative embodiment in which the PVC from the gateway network unit is with an adjacent network element, and where that adjacent network element is not the remote network element for which the software image is destined, there would not be a match between the IP destination address of the packets and the IP address of the MCU of that adjacent network element. In that case, the MCU software of the adjacent network element would look up a VCI/VPI value associated with a PVC to an adjacent network element, and forward the packets back to the ATM switch fabric unit, along with the new VCI/VPI value. The ATM switch fabric unit would then form cells having the new VCI/VPI value in their headers, and forward the cells to an output interface associated with that PVC. The IP packets would then be received by the next adjacent network element, which would again determine if the destination IP address of the packets is the IP address of an MCU within that network element. In this way the IP packets continue to be forwarded from network element to network element until they reach the target network element, into which the software image is downloaded.

The functions herein described can be implemented in many forms, including one or more Application Specific Integrated Circuits or any other suitable hardware implementation, or some combination of hardware components and software. Where a portion of the functionality is provided using software, that software may be provided to the computer in many ways; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media such as computer or telephone networks via a modem.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A network element, comprising:
    an active/standby pair of line units, each of said active/standby pair of line units being operative to maintain data communications through said network element using a first communications protocol;
    an active/standby pair of switch fabric units, each of said active/standby pair of switch fabric units being operative to maintain data communications through said network element using a second communications protocol;
    at least one service unit, said at least one service unit including a first backplane interface operative to support said first communications protocol, and a second backplane interface operative to support said second communications protocol; and
    a management and control unit operative to provide a control infrastructure for said network element,
    wherein said management and control unit is further operative to control one or more of at least one of said active/standby pair of line units, at least one of said active/standby pair of switch fabric units, and said at least one service unit, for selectively communicating data units between said active/standby pair of line units and said active/standby pair of switch fabric units, between said active/standby pair of line units and the first backplane interface supporting said first communications protocol, and between said active/standby pair of switch fabric units and the second backplane interface supporting said second communications protocol, in response to one of provisioning information provided by said management and control unit and information contained within the respective data unit.

2. The network element of claim 1 wherein said first communications protocol is synchronous transfer mode (STM).

3. The network element of claim 2 wherein each of said active/standby pair of line units comprises:
    an optical interface to a synchronous transfer mode ring;
    a synchronous transfer mode switch fabric; and
    a timing circuit operative to provide a timing reference to said at least one service unit.

4. The network element of claim 1 wherein said second communications protocol is asynchronous transfer mode (ATM).

5. The network element of claim 4 wherein each of said active/standby pair of switch fabric units comprises an asynchronous transfer mode switch fabric.

6. The network element of claim 1 wherein said management and control unit is operative to execute a software program to perform downloading of an executable software image from said management and control unit to said at least one service unit.

7. The network element of claim 6 wherein said management and control unit comprises an overhead processor for processing overhead information received in accordance with said first communications protocol.

8. The network element of claim 1 wherein said first communication protocol is Ethernet.

9. The network element of claim 8 wherein said second communication protocol is synchronous transfer mode (STM).

* * * * *

UNITED STATES PATENT AND TRADEMARK OFFICE
CERTIFICATE OF CORRECTION

PATENT NO.        : 7,382,722 B2
APPLICATION NO.   : 11/302619
DATED             : June 3, 2008
INVENTOR(S)       : Stephen J. Brolin et al.

It is certified that error appears in the above-identified patent and that said Letters Patent is hereby corrected as shown below:

Column 1, lines 14-15, delete ", issued as U.S. Pat. No. 6359,859"; and

Column 13, line 66 "and 144" should read --and LEDS 144--.

Signed and Sealed this

Thirty-first Day of March, 2009

JOHN DOLL
*Acting Director of the United States Patent and Trademark Office*